US006610436B1

(12) United States Patent
Dearnaley et al.

(10) Patent No.: US 6,610,436 B1
(45) Date of Patent: Aug. 26, 2003

(54) CATALYTIC COATINGS AND FUEL CELL ELECTRODES AND MEMBRANE ELECTRODE ASSEMBLIES MADE THEREFROM

(75) Inventors: Geoffrey Dearnaley, San Antonio, TX (US); James H. Arps, San Antonio, TX (US)

(73) Assignee: Gore Enterprise Holdings, Newark, DE (US)

( * ) Notice: Subject to any disclaimer, the term of this patent is extended or adjusted under 35 U.S.C. 154(b) by 0 days.

(21) Appl. No.: 09/509,849
(22) PCT Filed: Sep. 11, 1998
(86) PCT No.: PCT/US98/18938
§ 371 (c)(1), (2), (4) Date: Sep. 18, 2000
(87) PCT Pub. No.: WO99/13128
PCT Pub. Date: Mar. 18, 1999
(51) Int. Cl.$^7$ .................................................. H01M 4/90
(52) U.S. Cl. .............................. 429/44; 429/40; 429/42
(58) Field of Search ............................. 429/40, 44, 42

(56) References Cited

U.S. PATENT DOCUMENTS 5,084,144 A * 1/1992 Reddy et al. ............. 429/42 X
5,750,013 A * 5/1998 Lin

* cited by examiner

Primary Examiner—John S. Maples
(74) Attorney, Agent, or Firm—Paula D. Morris & Associates P.C.

(57) ABSTRACT

Fuel cell electrodes comprising a minimal load of catalyst having maximum catalytic activity and a method of forming such fuel cell electrodes. The preferred method comprises vaporizing a catalyst, preferably platinum, in a vacuum to form a catalyst vapor. A catalytically effective amount of the catalyst vapor is deposited onto a carbon catalyst support on the fuel cell electrode. The electrode preferably is carbon cloth. The method reduces the amount of catalyst needed of a high performance fuel cell electrode to about 0.3 mg/cm$^2$ or less, preferably to about 0.1 mg/cm$^2$. The electrocatalytic layer formed comprises unique, rod-like structures.

161 Claims, 16 Drawing Sheets

10.0kV 4.2nm x 50.0k SE(U) 8/21/98 600nm ebpvd 10.0kV 5.0nm x 5.00k SE(U) 8/21/98 6.00um ebpvd10.0kV 5.0nm x 10.0k SE(U) 8/21/98 3.00um 10.0kV 5.0nm x 5.00k SE(U) 8/21/98 6.00um 10.0kV 5.0nm x 25.0k SE(U) 8/21/98 1.20um 10.0kV 5.0nm x 25.0k SE(U) 8/21/98 1.20um ebpvd 10.0kV 5.0nm x 50.0k SE(U) 8/21/98 600nm 10.0kV 5.0nm x 25.0k SE(U) 8/21/98 1.20um ebpvd 10.0kV 5.0nm x 25.0k SE(U) 8/21/98 1.20um ebpvd 10.0kV 5.0nm x 50.0k SE(U) 8/21/98 600nm sputter 10.0kV 4.2nm x 5.00k SE(U) 8/21/98 6.00um sputter 10.0kV 4.2nm x 50.0k SE(U) 8/21/98 6.00nm sputter 10.0kV 4.2nm x 50.0k SE(U) 8/21/98 600nm sputter 10.0kV 4.2nm x 25.0k SE(U) 8/21/98 1.20um sputter 10.0kV 4.2nm x 50.0k SE(U) 8/21/98 600nm sputter 10.0kV 4.2nm x 25.0k SE(U) 8/21/98 1.20um

CATALYTIC COATINGS AND FUEL CELL ELECTRODES AND MEMBRANE ELECTRODE ASSEMBLIES MADE THEREFROM

CROSS-REFERENCE TO RELATED APPLICATIONS

The present application is related to the following patents: U.S. Pat. No. 5,624,718, filed Mar. 3, 1995; U.S. Pat. No. 6,159,533, filed Dec. 11, 1997; U.S. Pat. No. 5,795,672, filed Jul. 2, 1996; U.S. Pat. No. 6,153,327, filed Aug. 17, 1998.

FIELD OF THE INVENTION

The application provides a process for depositing a minimal load of an electrocatalyst (preferably comprising platinum) onto a support, preferably a support capable of use as a fuel cell electrode (most preferably carbon cloth). While maximizing the catalytic activity of the catalyst. The application also is directed to products comprising novel electrocatalytic coatings comprising rod-shaped structures.

BACKGROUND OF THE INVENTION

A fuel cell is an electrochemical device in which electrical energy is generated by chemical reaction without altering the basic components of the fuel cell—that is, the electrodes and the electrolyte. Fuel cells combine hydrogen and oxygen without combustion to form water and to produce direct current electric power. The process can be described as electrolysis in reverse. The fuel cell is unique in that it converts chemical energy continuously into electrical energy without an intermediate conversion to heat energy.

Fuel cells have been pursued as a source of power for transportation because of their high energy efficiency (unmatched by heat engine cycles), their potential for fuel flexibility, and their extremely low emissions. Fuel cells have potential for stationary and vehicular power applications; however, the commercial viability of fuel cells for power generation in stationary and transportation applications depends upon solving a number of manufacturing, cost, and durability problems.

One of the most important problems is the cost of the proton exchange catalyst for the fuel cell. Some of the most efficient catalysts for low temperature fuel cells are noble metals, such as platinum, which are very expensive. Some have estimated that the total cost of such catalysts is approximately 80% of the total cost of manufacturing a low-temperature fuel cell.

In a typical process, an amount of a desired noble metal catalyst of from about 0.5–4 $mg/cm^2$ is applied to a fuel cell electrode in the form of an ink, or using complex chemical procedures. Unfortunately, such methods require the application of a relatively large load of noble metal catalyst in order to produce a fuel cell electrode with the desired level of electrocatalytic activity, particularly for low temperature applications. The expense of such catalysts makes it imperative to reduce the amount, or loading, of catalyst required for the fuel cell. This requires an efficient method for applying the catalyst.

In recent years, a number of deposition methods, including rolling/spraying, solution casting/hot pressing, and electrochemical catalyzation, have been developed for the production of Pt catalyst layers for proton exchange membrane (PEM) fuel cells. Although thin sputtered Pt coatings deposited on carbon cloth can measurably improve fuel cell performance, this approach generally is not considered to be viable for large area deposition or as a stand alone treatment for applying platinum. Continuing challenges remain in the development of scalable methods for the production of large-area (>300 $cm^2$), high performance (>1 $A/cm^2$ at 0.6 V) fuel cell electrodes with low Pt loadings (<0.3 $mg/cm^2$).

SUMMARY OF THE INVENTION

The present invention provides a method for depositing onto a support a vaporizable composition comprising a catalytic component. The method comprises converting the vaporizable composition into a vapor, and depositing the vapor onto the support in an amount sufficient to produce a concentration of the catalytic component adapted to produce a catalytically effective coating on the support. The invention also is directed to electrodes produced by the method, and to electrodes comprising a support comprising a deposit disposed thereon which comprises a catalytically effective load of an electrocatalyst comprising an electrocatalytic active area at least in part comprising rod-shaped structures.

BRIEF DESCRIPTION OF THE INVENTION

Figure 1:
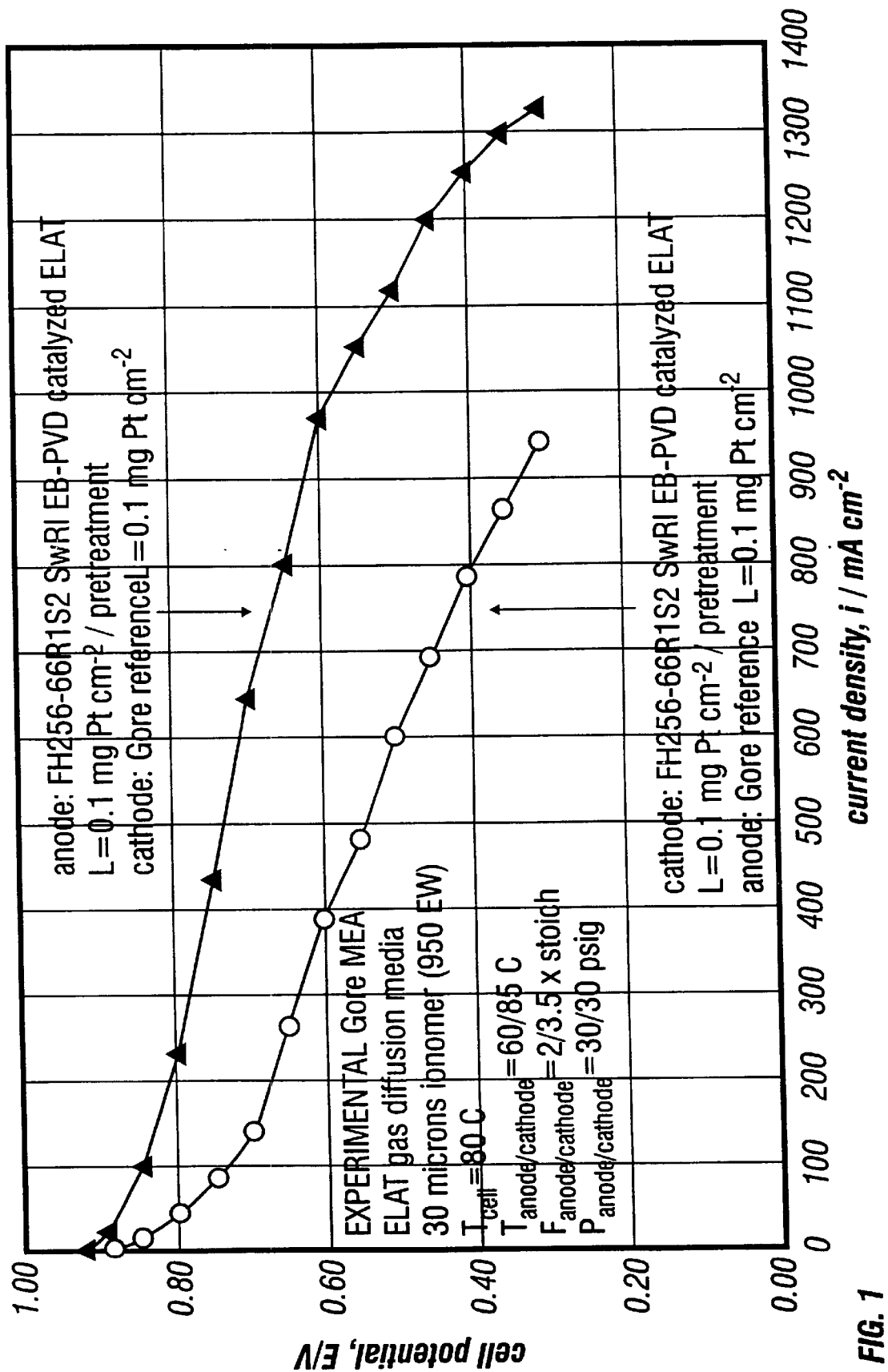
FIG. 1 is a graph depicting the polarization performance of an experimental electrode used as cathode and anode at a cell pressure of 206.85 kPa (30 psig). The experimental electrode was made from a carbon-only ELAT carbon cloth electrode, available from E-TEK, Natick, Mass., bearing Pt deposited using electron beam physical vapor deposition (EB-PVD) according to the present invention, as described in Examples III and IV.

Vacuum deposition techniques are routinely employed in a variety of applications ranging from metallized layers in the fabrication of semiconductors to barrier coatings for food packaging, hard coatings for cutting tools, and optical thin films. Some of the typical methods employed include chemical vapor deposition, physical vapor or thermal deposition, ion sputtering, and ion beam assisted deposition (IBAD). Because the materials are deposited in a vacuum (typically less than 13.3 mPa, or $1 \times 10^{-4}$ torr), contamination of the films can be minimized while maintaining good control over film thickness and uniformity. Such techniques, in many cases, lend themselves to deposition of materials over large areas via a reel-to-reel or web coating processes.

The present invention uses vacuum deposition techniques, preferably EB-PVD, to deposit a catalyst onto a support. The support for the claimed coating may be any number of materials, preferred materials being suitable for use in electrodes in fuel cells. Such materials include, but are not necessarily limited to proton exchange membranes (PEMs), carbon cloth, and carbon paper. Preferred supports are carbon supports.

Suitable PEMs include, but are not necessarily limited to polymer electrolyte membranes or ionomers, such as NAFION™, available from Dupont, Inc., Wilmington, Del., and most preferably a fluoroionomeric membrane comprising a composite of polytetrafluoroethylene with impregnated ion exchange media known as GORE-SELECT®, available from W. L. Gore & Associates, Elkton, Md.

Suitable carbon supports include, but are not necessarily limited to, graphite, carbon fiber, and carbon cloth. Suitable commercially available carbon gas diffusion media for use as a support include, but are not necessarily limited to: carbon gas diffusion electrodes; iso-molded graphite; carbon bundles; preferably having 6,000 or 12,000 carbon filaments/bundle; reticulated carbon; carbon cloth; and, carbon paper. A preferred carbon support is carbon cloth, preferably a carbon-only ELAT carbon cloth electrode, available from E-TEK, Natick, Mass.

The support preferably should resist corrosion in an acid environment, offer good electrical conductivity and, for carbon supports, allow fast permeation of oxygen (cathode) and hydrogen (anode), comply with thin layer manufacturing techniques, and contribute little to the weight and cost of the fuel cell assembly.

A catalyst is deposited onto the support, preferably using vacuum deposition techniques. As used herein, the term "catalyst" is defined as a substance that increases the rate of approach to equilibrium of a chemical reaction without being substantially consumed in the reaction. A catalyst works by forming chemical bonds to one or more reactants and thereby facilitating their conversion. A catalyst does not affect the reaction equilibrium. A catalyst provides for alternate reaction pathways/mechanisms that offer an overall lower activation energy for the reaction, thus accelerating the rate of turnover.

In electrochemical systems the reaction rate (power density/current density) is controlled by controlling temperature and electrocatalysis. Electrocatalysts are substances (metals, metal oxides, non-metals, organometallics, etc.) that can promote the rate of electrochemical reactions, i.e., ionization, deionization, for a given surface area. The electrocatalyst is a substance that accelerates the rate of forward and backward charge transfer reactions for a given redox system (charge transfer reaction) without perturbing chemical equilibrium (thermodynamics is not affected by the presence of a catalyst). An electrocatalyst provides for alternative reaction pathways/mechanisms that offer an overall lower activation energy for the electrochemical reaction, thus accelerating the rate of electrochemical turnover. The rate at which a reaction at an electrode surface proceeds may be limited by the intrinsic kinetics of the heterogeneous process. In non-electrochemical systems, the macroscopically observed reaction rate is the result of a series of elementary processes.

A key difference between an electrocatalyst and other types of catalysts is the ability of the electrocatalyst to manipulate an additional driving force variable: the electric potential. A change in potential of one volt at the surface of the electrocatalyst/electrode can cause a change in reaction rate of eight orders of magnitude. This change may be equivalent to an increase in temperature of several hundred degrees Celsius for a typical catalytic reaction. (i.e., non-electrochemical reaction). For fuel cell applications heterogeneous electrocatalysts exist as foils, deposited films, individual particles or supported particles. The word "heterogeneous" means that the reactant is normally in a different phase (gas or liquid) than the electrocatalyst (solid).

To describe how a particular surface electrocatalyzes/catalyzes a particular reaction requires a knowledge of three factors: the mechanism of the reaction pathway; the chemisorption energy of the surface species; and, the effective activation energy (energies) of the reaction. Metals with empty "d" orbitals are suitable electrocatalysts because they adsorb $H_2$ rapidly, with low activation energies of adsorption. Referring to the Periodic Table of the Elements, suitable electrocatalysts include, but are not necessarily limited to: Group IVA metals (Ti, Zr, Hf); Group VA metals (V, Nb, Ta); Group VIA metals (Cr, Mo, W); and, Group VIIA metals (Mn, Tc, Re). These metals appear to adsorb $H_2$ with high enthalpy of adsorption. Preferred electrocatalysts are metals which adsorb $H_2$ with lower heats, including but not necessarily limited to Groups VIIIA, B, and C (Fe, Ru, Os; Co, Rh, Ir; Ni, Pd, Pt), preferably Ni, Pd, or Pt, most preferably Pt. The group IB metals (Cu, Ag, Au) have low heats of adsorption, but are not preferred as $H_2$ adsorption catalysts because they have slow activated chemisorption.

The Group VIII metals, preferred electrocatalysts for use in fuel cell electrodes, are believed to have heats of adsorption in a range which enables the reactant to chemisorb strongly enough to allow for surface reaction (electrochemical oxidation/reduction by breakdown and discharge of adsorbed species) but not strongly enough to form surface-bonded species. Due to the greater activation energy of chemisorption for oxygen, electrocatalytic reactions which involve surface oxygen require higher temperatures in order to produce satisfactory reaction rates than do reactions which involve surface hydrogen. For example, the most widely used oxygen electrodes for low temperatures are silver and platinum. Summarizing, suitable catalysts for electrochemical applications include, but are not necessarily limited to Pt, Pd, Ru, Rh, Ir, Ag, Au, Os, Re, Cu, Ni, Fe, Cr, Mo, Co, W, Mn, Al, Zn, Sn, with preferred catalysts being Ni, Pd, Pt, most preferably Pt.

In order to apply an electrocatalytic coating to the support, the electrocatalyst is heated to vaporization. The heating may be provided using any suitable source, including but not limited to an electron beam, electrical resistance heating, microwave, and laser. In a preferred embodiment, the catalyst is heated using an electron beam.

In a preferred embodiment, the support is placed in a vacuum chamber provided with a crucible, preferably made of graphite, with a mechanism for directing a high power electron beam onto a solid chunk of the catalyst to produce a catalyst vapor. Where platinum is the catalyst, the catalyst is heated with the electron beam to between about 2300° C.–2600° C. (4172° F.–4712° F.) to form a vapor.

During the deposition process, the pressure in the vacuum chamber should be pumped down to a pressure sufficient to cause the vapor to condense onto the support. A preferred pressure is about 13.3 mPa (about $10^{-4}$ torr) or less. As used herein, the term "in a vacuum" is defined to mean a pressure of about 13.3 mPa ($10^{-4}$ torr) or less. The vaporized catalyst preferably should be allowed to deposit or condense onto the support in a vacuum. The temperature in the vacuum may vary; however, the temperature should be low enough not to damage the support, and low enough to permit the catalyst vapor to condense onto the support. Preferably, the temperature should be about 100–200° C. or less. The deposition rate preferably should range from about 0.5–10 Å/sec.

The deposition should continue until a catalytically effective amount of the catalyst is deposited onto the support. As used herein, the term "catalytically effective" is defined to mean effective to catalyze the necessary reactions. The term "catalytically effective amount" is defined to mean as small an amount of the catalyst as possible to result in enough active catalyst to catalyze the necessary reactions. Typically, the amount of catalyst deposited to result in a catalytically effective amount should be from about 0.01 to about 0.3 mg/cm$^2$, preferably less than about 0.2 mg/cm$^2$. The thickness of the coating may be monitored by standard methods, e.g., using the frequency change of a quartz crystal oscillator. The weight of the film may be determined by weighing a known area of the support before and after depositing the film.

The support preferably is used as an electrode in a fuel cell. Preferred fuel cell electrodes are as thin as possible, typically having a thickness between about 0.010–0.175 inches. Where the support is a PEM, the PEM preferably should be treated with a carbon catalyst support, such as carbon ink, using standard techniques well known in the art. Carbon supports preferably should be wet-proofed.

Individual membranes or electrodes may be prepared, or the process may be scaled up for production purposes. Where the support is thermally sensitive, cooling may be required. In the laboratory, cooling may be accomplished by mounting the support on the surface of an aluminum cylinder which is rotated through the ion and coating flux. With this setup, water cooling is no longer necessary because of the sufficiently large thermal mass of the cylinder combined with the fact that the support is no longer continuously exposed to the ion beam and coating flux. This fixture appears to hold promise from a scale-up perspective as large areas of support material can be rolled up on a drum and coated in a reel-to-reel process. Preferably, a scaled up arrangement will be a reel-to-reel arrangement in vaccuo. The coating technique described herein is adaptable for use with conventional "web coating" technologies.

Upon incorporation into a membrane electrode assembly and into a fuel cell supplied with hydrogen gas under suitable flow conditions, the electrocatalytic coating of the invention exhibits an open circuit voltage of at least about 0.8 V, preferably about 1 V. The term "open circuit voltage" or "open cell voltage" is defined as the spontaneous potential or voltage present in a fuel cell when no current is allowed to flow. This potential is known as the cell equilibrium potential and its theoretical value can be derived from thermodynamics using the Nernst relationship:

$$E = E^\circ + \frac{RT}{nF} \ln\left[\frac{\prod (\text{reactant activity})}{\prod (\text{product activity})}\right] \quad [1]$$

where n is the number of electrons participating in the reaction, F is the Faraday's constant (96,439 coulombs/g-mole electron), R is the universal gas constant, T is the cell temperature and E° is the reversible standard cell potential for the reaction, which is directly related to the maximum electrical work $W_e$ obtainable in a fuel cell operating at constant temperature and pressure and is thermodynamically given by the change in Gibbs free energy (ΔG) of the electrochemical reaction:

$$W_e = \Delta G^\circ = -nFE^\circ \quad [2]$$

For the overall cell reaction, the open circuit potential increases with an increase in the activity of reactants and a decrease in the activity of products. Changes in cell temperature and pressure also influence the reversible cell potential. Practically, the open circuit voltage is the maximum voltage attainable during a fuel cell polarization or 1 V curve, and corresponds to the cell potential at which the drawn net cell current is zero.

For example, after appropriate equilibration time, a PEM fuel cell will observe an open circuit voltage of from about 0.8 V and about 1 V versus a reference standard hydrogen electrode when operating: (a) at a temperature of from about 50° C. to about 130° C.; (b) with hydrogen and air as reactants; (c) humidified at a temperature of from about 50° C. to about 140° C.; (d) with relative humidities of from about 0 to about 100%; (e) with pressures of from about 0 to about 100 psig; and, (f) with flows large enough to assure complete irrigation of the electrocatalyst phase throughout the electrode.

The vacuum deposition techniques of the present invention are capable of forming large-area (>300 cm$^2$), high performance fuel cell electrodes with low Pt loadings (<0.3 mg/cm$^2$, preferably about 0.1 mg/cm$^2$) which are capable at a cell potential of about 0.6 V of producing a power output of well over 400 mA cm$^{-2}$, preferably over about 800 mA cm$^{-2}$, most preferably about 1000 mA cm$^{-2}$, under the following conditions: in a single cell fuel cell fixture; with appropriate gas distribution manifolds and appropriate gasketing; using ELAT as gas diffusion material; with appropriate cell compression (from about 5.65 to about 33.89 N m/bolt, or about 50 to about 300 lb in/bolt compression torque); at cell operating conditions which typically include water saturation of the anode and (H$_2$) reactant feed at humidification temperatures of from about 40 to about 90° C.; cell temperatures of about 40 to about 80° C.; volumetric flowrate reactant feeds of about 1.2–2 and about 2–5 times the stoichiometric value, for H$_2$ and air, respectively; and cell pressure set from about 0 to about 413.7 kPa gauge (1 and about 60 psig) for the anode (H$_2$ electrode) and cathode (air electrode).

Tafel analysis on experimental cathodes (described in Example IV) demonstrates about a five-fold difference in oxygen reduction exchange current density between the vapor deposition techniques of the present invention and conventional sputtered electrodes ($i_{o,PVD}/i_{o,spurt}$~4.89). The difference suggests that vapor deposited cathodes, such as the EB-PVD Pt deposited cathodes formed in Examples III and IV, have a substantially larger electrocatalytic active area or "three phase boundary" (TPB) than conventional sputtered Pt cathodes This electrochemical conclusion was confirmed by field-emission scanning electron microscopy pictures (micrographs or FE-SEMs). FE-SEMs showed the presence of a microstructure in the inventive vapor deposited electrodes with readily recognizable Pt particles and the presence of "rod-shaped" structures 10, which become visible beginning at about ×10 k magnification, as shown in FIGS. 14–15 and 17–22. These rod-shaped particles were not observed in the sputtered sample, as shown in FIGS. 23–28.

Figure 17:
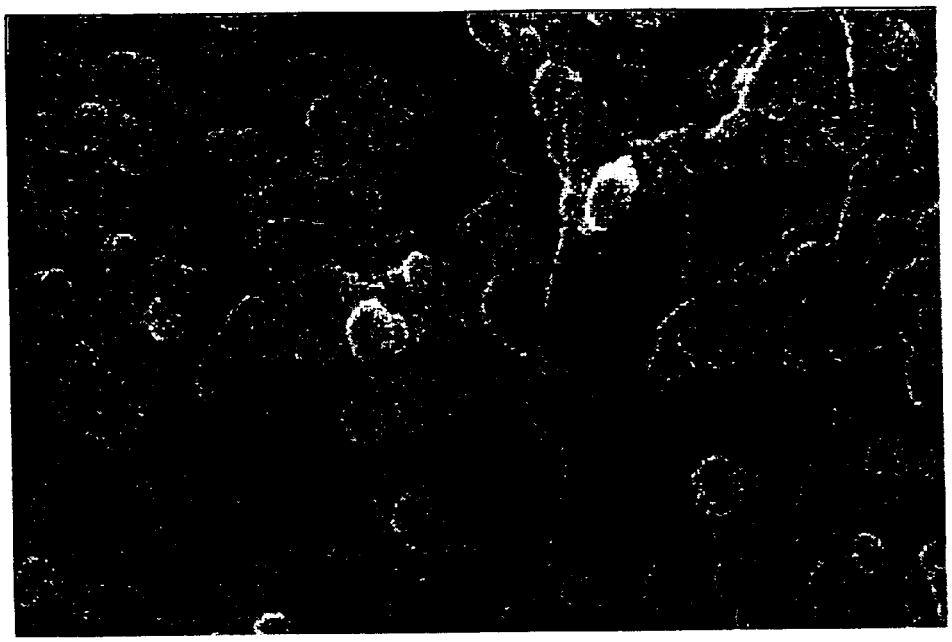
Figure 18:
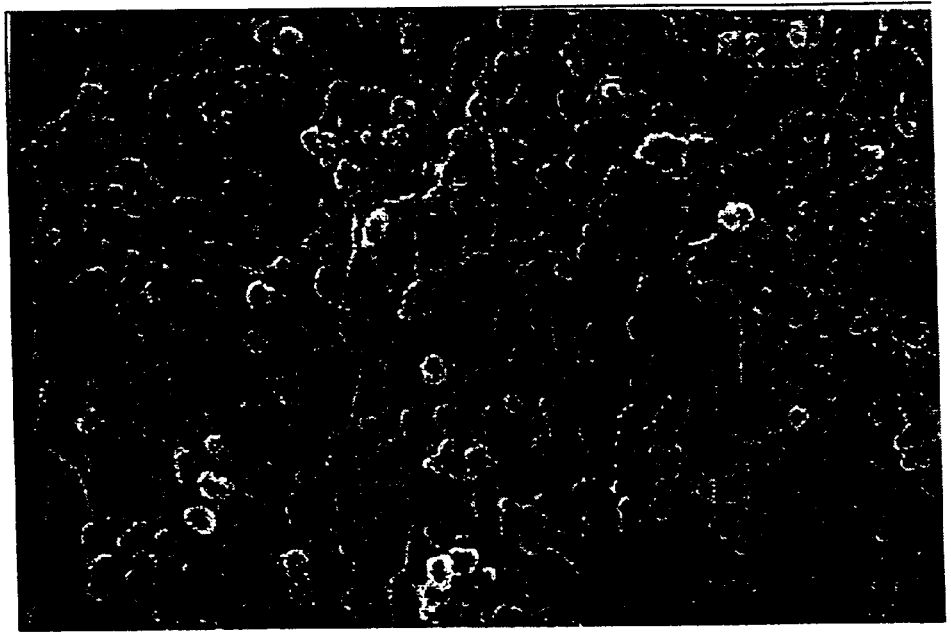
Figure 19:
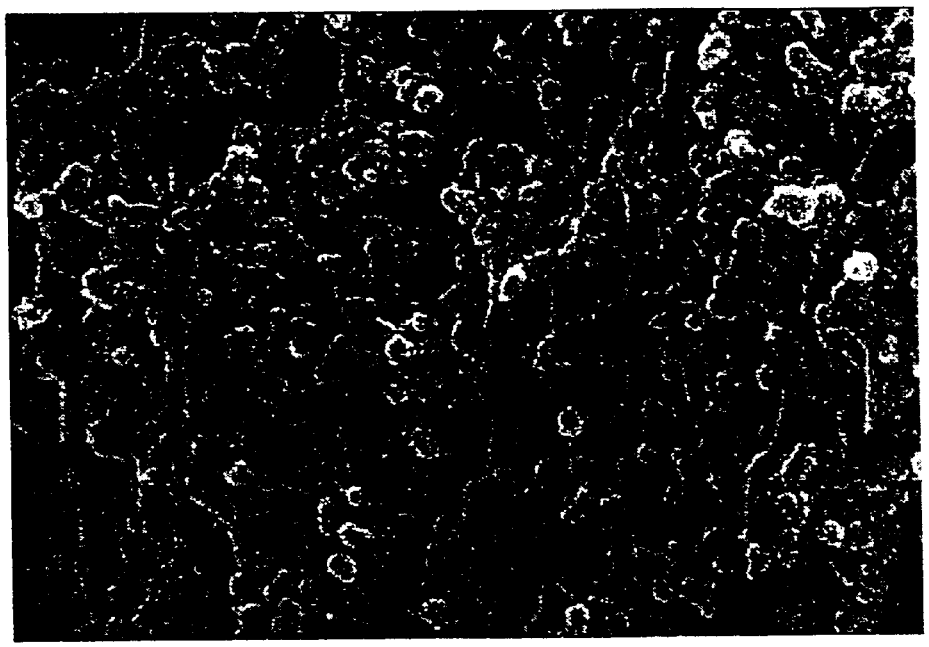
Figure 20:
Figure 21:
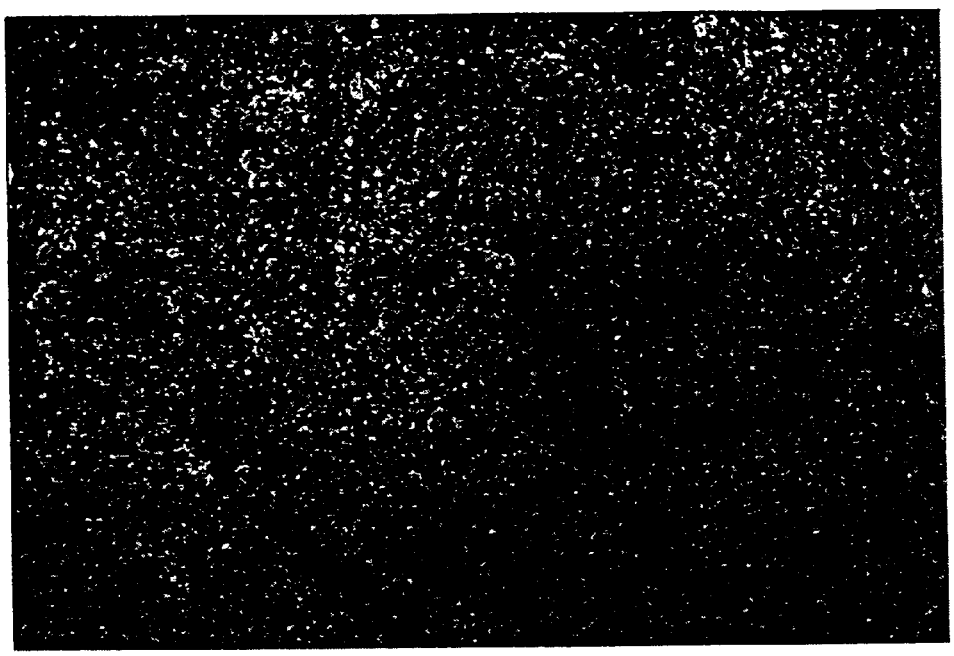
FIGS. 21–26 are FE-SEMs of ELAT gas diffusion media catalyzed using conventional sputter deposition of Pt, as described in Examples III and IV, at various magnifications.
Figure 22:
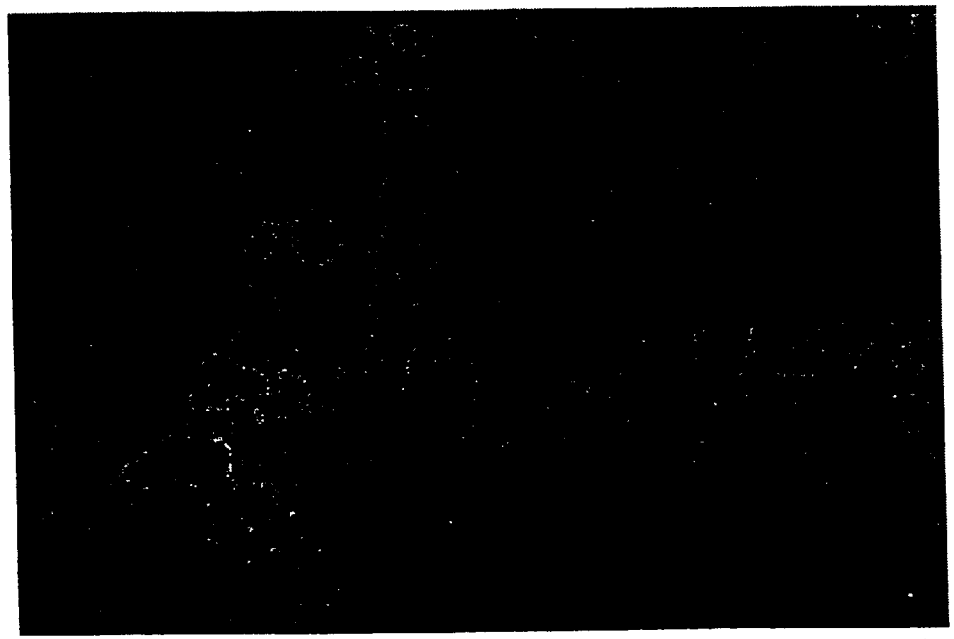
Figure 23:
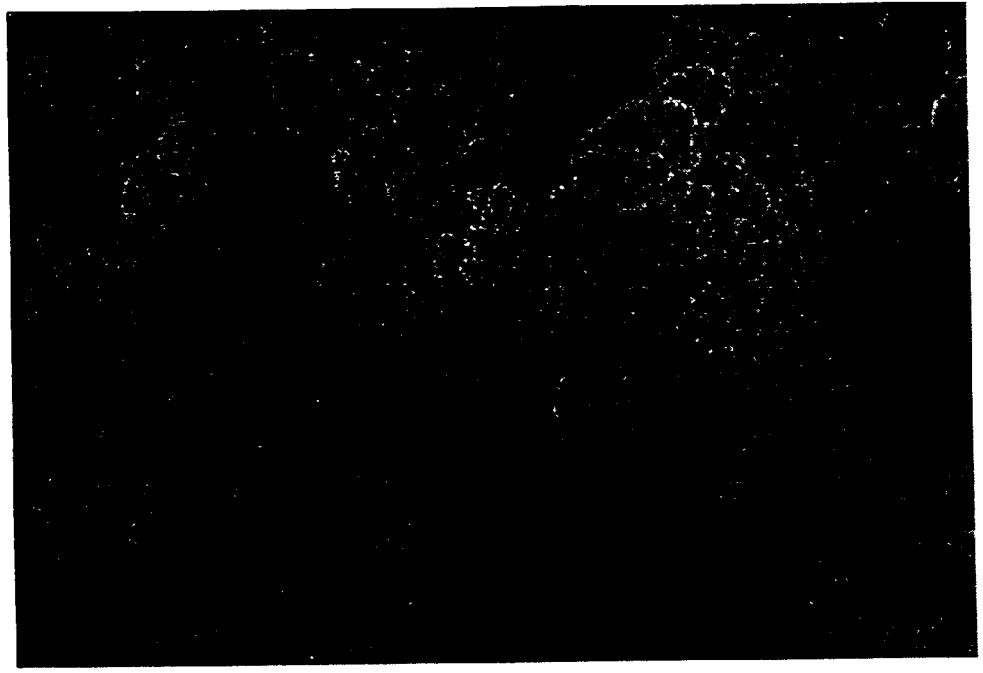
Figure 24:
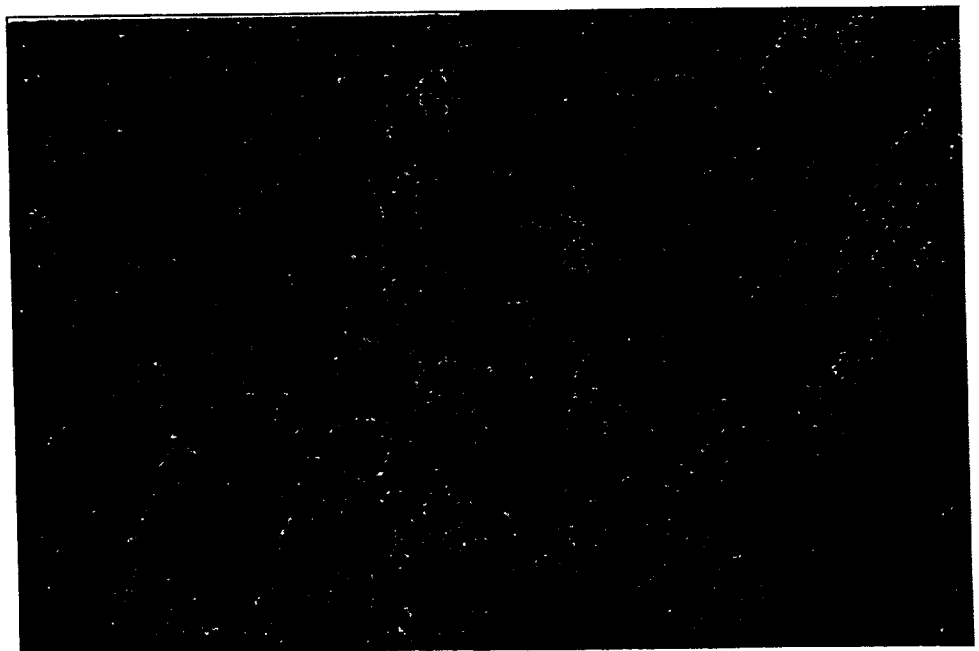
Figure 25:
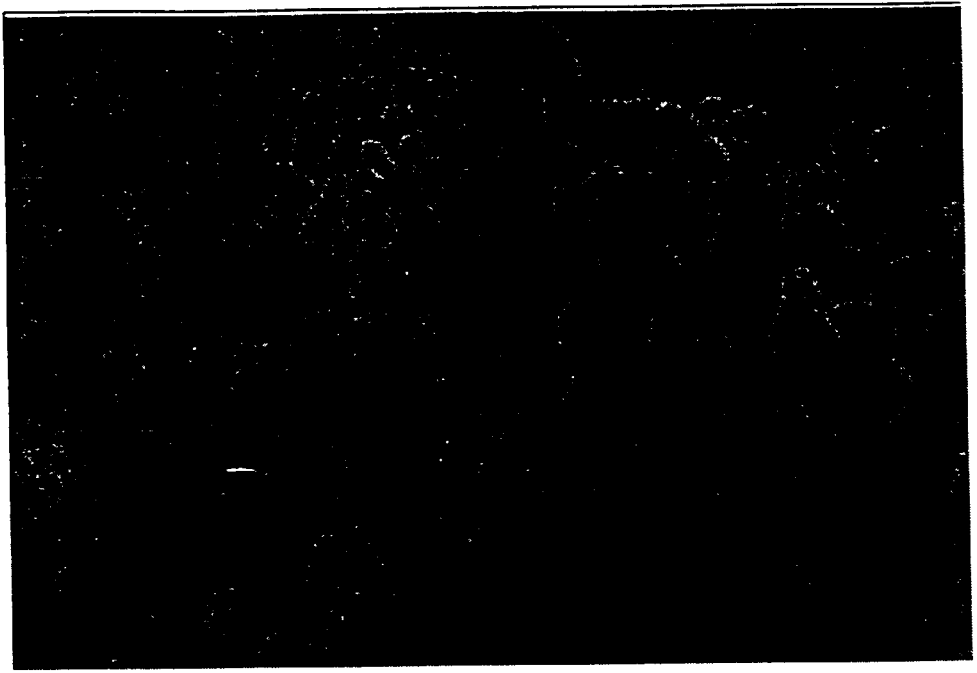
Figure 26:
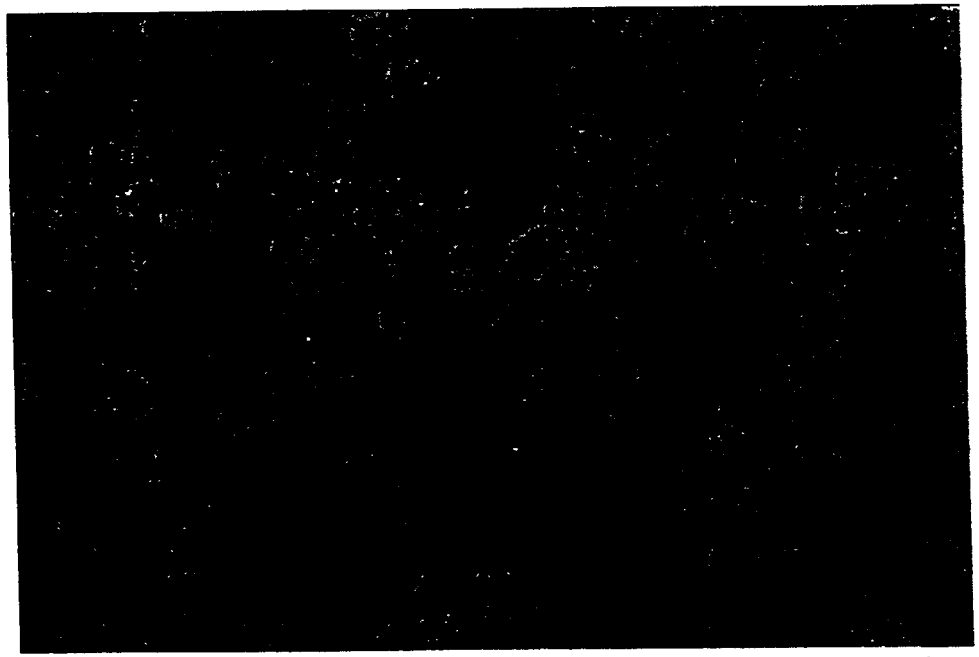

For purposes of the present application, the term "rod-shaped" is defined to mean substantially cylindrical shaped structures having a diameter 10a, as shown in FIG. 17, and a length 10b, as shown in FIG. 17. The rod-shaped structures shown in FIGS. 12–13 and 15–20 have (a) a diameter 10a (FIG. 17) of from about 40–about 60 nm, typically about 60 nm, and (b) a length which is difficult to verify, but appears to vary.

Electrodes made according to the present invention may be used in fuel cells having many different constructions known to those skilled in the art. The invention will be better understood with reference to the following examples, which are for illustrative purposes only and should not be construed as limiting the invention, which is defined by the claims.

EXAMPLE I

Using a vacuum chamber 2 m long and 1.5 m in diameter, candidate coatings were first deposited on glass slides and small coupons of representative membrane and electrode material, and subjected to compositional and microstructural analysis. Next, a series of larger-area electrode materials were coated and evaluated using a small home-built test cell, described below.

After a final down-selection, a limited number of full scale 150 cm$^2$ electrodes were fabricated and tested. Special sample fixtures, described in more detail in Example II, were developed to allow for the coating of carbon cloth electrodes over areas as large as 300 cm$^2$. Samples up to 250 cm$^2$ were coated using a planetary gear arrangement. The samples were asynchronously rotated through an electron beam-physical vapor deposition (EB-PVD) coating flux to ensure uniform deposition of the Pt over the entire electrode surface.

Carbon cloth and carbon paper materials, both plain and wet-proofed (i.e. coated with TEFLON®), were coated with 0.01, 0.05, and 0.10 mg/cm$^2$ of Pt. In addition, wet-proofed samples treated with a layer of carbon-only ELAT were procured from E-TEK for Pt coating in a similar manner.

A comparison of the thicknesses, morphologies, and Pt distributions of selected fuel cell electrode materials was performed using scanning electron microscopy (SEM) and transmission electron microscopy. The objective of such measurements was to determine the effect of electrode structure on the resulting efficiency of the fuel cell.

Performance analysis of catalyst coated electrode materials was undertaken using a small "home-built" test cell The simple test cell consisted of two 6.9 cm stainless steel flanges used as collector plates with single air/hydrogen inlets and pairs of 100-mesh stainless steel screens mounted on each side of the electrode to provide a degree of gas diffusion. The cell active area was approximately 64 cm$^2$ and the same electrode material was used for both the anode and the cathode. The system was pressurized with humidified hydrogen and compressed air at 96.53 kPa (14 psig) and a flow rate of ~0.5 liters per minute. Current-voltage tests were conducted at ambient temperature at each outlet.

In all tests, the EB-PVD Pt-coated ELAT material repeatedly demonstrated superior behavior compared to a higher loaded control material, namely E-TEK platinum over VULCAN XC-72 ELAT solid polymer electrolyte electrode (4 mg/cm$^2$). Measurable improvements in efficiency were observed for the carbon cloth with increasing Pt loading. It was also possible to further reduce the Pt loading of the EB-PVD coated carbon-only material on the anode side to as low as 0.01 mg/cm$^2$ with minimal reduction in performance.

EXAMPLE II

Fabrication and testing of three full scale 150 cm$^2$ electrodes was performed based on the results of the screening tests with the small test fixture.

The electrodes prepared for testing are summarized in Table 2.

TABLE 2

| Sample I.D. | Membrane/Electrode Material | Deposition Method | Pt Loading (mg/cm$^2$) (Anode/Cathode) |
|---|---|---|---|
| 1 | 20 µm GORE SELECT ®/C-only ELAT | EB-PVD Pt | 0.10/0.01 |
| 2 | 50 µm GORE SELECT ®/C-only ELAT | EB-PVD Pt | 0.05/0.05 |
| 3 | 20 µm GORE SELECT ®/C paper | Sputtered Pt | 0.10/0.10 |

In order to effectively evaluate the full-scale electrodes, a Scribner Associates Model 890 load system was leased for use with a test fixture. Basically, the test fixture consisted of the chosen membrane sandwiched by the chosen electrodes surrounded by graphite plates having flow channels to allow the passage of hydrogen and oxygen gas into contact with the electrodes. A metal plate sandwiched the assembly on each side. The metal plates had suitable holes drilled for introducing the hydrogen and oxygen gas, and electrical leads collected current and connected each plate to the load unit. The 1 kW, 125 amp Scribner load unit recorded all performance data from the cell while controlling the temperatures of the cell and feed gases, ensuring consistent, repeatable results. The comparison test fixture was rated at more than 100 watts depending on the configuration and operational mode. The modular design of the cell allowed for many different possible configurations and use of different material thicknesses.

Particular attention was paid to the gas handling system in assembling the test cell. All of the tubing and connectors were made of a 316 stainless steel and TEFLON (where electrical isolation was needed) in an effort to limit transport of metal cations into the cell. The gases were passed through a pair of Perma Pure Inc. NAFION-based humidifiers and then carried to the cell via stainless tubing wrapped in heater tape to maintain proper temperature. Next, each gas was directed into 3-branch manifolds for the gas inlets and outlet. Exhaust gases were passed through a pair of flowmeters to measure the amount of excess fuel and air flow. Flowmeters were not installed on the upstream side as they contain a significant amount of aluminum parts which may contaminate the gases and hinder cell performance. A stainless steel reservoir with a built in heater was used to heat the cell and was controled by the Scribner load unit. A plastic submersible chemical pump circulated deionized water in a closed circuit composed of TEFLON tubing through the cell and humidifiers and back to the container. No active cooling of the cell was needed.

Performance tests typically were conducted at a temperature of 60° C. 30 psi humidified gasses, 3.5 time Stoichiometric Ratio (SR) or less on the air side, and 2 SR or less on the reactant side. The first objective was to match the performance curves for the electrode of the present invention with the control, comprising an electrode from a Gore PRIMEA® membrane electrode assembly, available commercially from W.L. Gore & Associates, Inc., under similar test conditions. After assembly, the cell was conditioned for several hours at low current. Once the performance stabilized, current voltage data was acquired starting at high currents and slowly ramping down.

Once the performance curve of the test membrane/electrode assembly had been matched with the performance curves of the controls, testing was performed. The cell was first conditioned for eight hours at a low current setting with humidified gasses at 30 psi. The highest current density achieved using the 100 nm/10 nm EB-PVD Pt-coated ELAT with the 20 $\mu$m membrane was 732 mA/cm$^2$ at 0.358 V. In general, the overall power output of EB-PVD deposited electrode was 10–50% less than the output of the control. However, it is important to point out that this performance was achieved with less than 20% of the total Pt loading of the baseline material.

The foregoing tests demonstrate successful use of EB-PVD in the fabrication of 150 cm$^2$ membrane electrode assemblies with total Pt loadings as low as 0.11 mg/cm$^2$.

EXAMPLE III

Experiments were performed to characterize the electrochemical (fuel cell performance) and morphological properties of experimental electrodes prepared by Pt EV-PVD and magnetron sputtering of ELAT® gas diffusion media. MEAs prepared with PVD electrodes (cathodes or anodes) yielded superior polarization performance compared to the sputtered half cells.

Electrode preparation: Vacuum vaporization-based catalyzed electrodes were prepared using (a) electron-beam physical vapor deposition (EB-PVD) according to the present invention, and (b) conventional magnetron sputtering of Pt. In each case, the Pt was deposited onto double-sided ELAT commercial carbon-cloth gas diffusion media. The catalyzation took place onto the "active side" of the diffusor, i.e., on the side normally in contact with electrocatalyst layers.

For EV-PVD, a catalyst deposition rate of 1 Å/sec was chosen. The chamber base pressure was about 13.3 mPa (10$^{-5}$ torr). The Pt source was 99.95% purity.

For magnetron sputtering, a 15.24 cm (6 in) diameter magnetron sputtering unit was used to sputter Pt onto the substrate at a rate of about 2 to about 3 Å/sec. The chamber base pressure was about 1.33 mPa (10$^{-4}$ torr). The Pt target was a foil with a purity 99.99%.

Electrodes at a loading level of 0.1 mg Pt cm$^{-2}$ were prepared using both techniques and compared. Energy dispersive spectroscopy (EDS) x-ray analysis detected only Pt as the vaporized phase using either technique. The catalyst layers formed using either technique had an average thickness of about 500 Å.

The Pt-catalyst electrodes were incorporated into experimental MEA's using methods known in the art. In order to solely characterize the performance of the vacuum coated electrode, e.g., as cathodes, MEA's were prepared using a Gore PRIME® membrane electrode assembly as an anode, and vice versa when the vacuum coated electrode was characterized as the anode half cell. The Gore PRIMEA® membrane electrode assembly presented a loading of 0.1 mg Pt cm$^{-2}$ and the experimental MEA's used a 30 $\mu$m GORE SELECT® (950EW) perfluorinated membrane to form a membrane electrode assembly in all cases.

EXAMPLE IV

Fuel Cell and Tafel Performance Tests: To electrochemically characterize the performance of the experimental electrodes as cathodes and anodes, H$_2$/air fuel cell testing analysis was performed. The MEAs containing electrode active areas of 25 cm$^2$ and 30$\mu$ GOPE SELECT® membranes were mounted in standard fuel cell reactor fixtures using ELAT gas diffusion media for the reference half cell and were clamped to standard compression levels. The fuel cell test was conducted using a fuel cell station commercially available from Globetech, Inc., Bryant, Tex. For the pressurized experiments, a 103.43/103.43 kPa and 206.85/206.85 kPa (15/15 psig and 30/30 psig) gauge anode and cathode, respectively; the cell temperature was set at about 80° C. with anode and cathode feeds humidified at about 60–70° C. and 85° C.; and, flowrates set at 2/3.5 times the stoichiometric value for H$_2$ and air, respectively. In some tests, a constant flow of 500–1000 standard cm$^3$/min was used for the H$_2$ and air, respectively. For the atmospheric pressure runs, the cell temperature and reactant humidification was set at about 60° C. The performance was evaluated at different times on stream (TOS).

Figure 2:
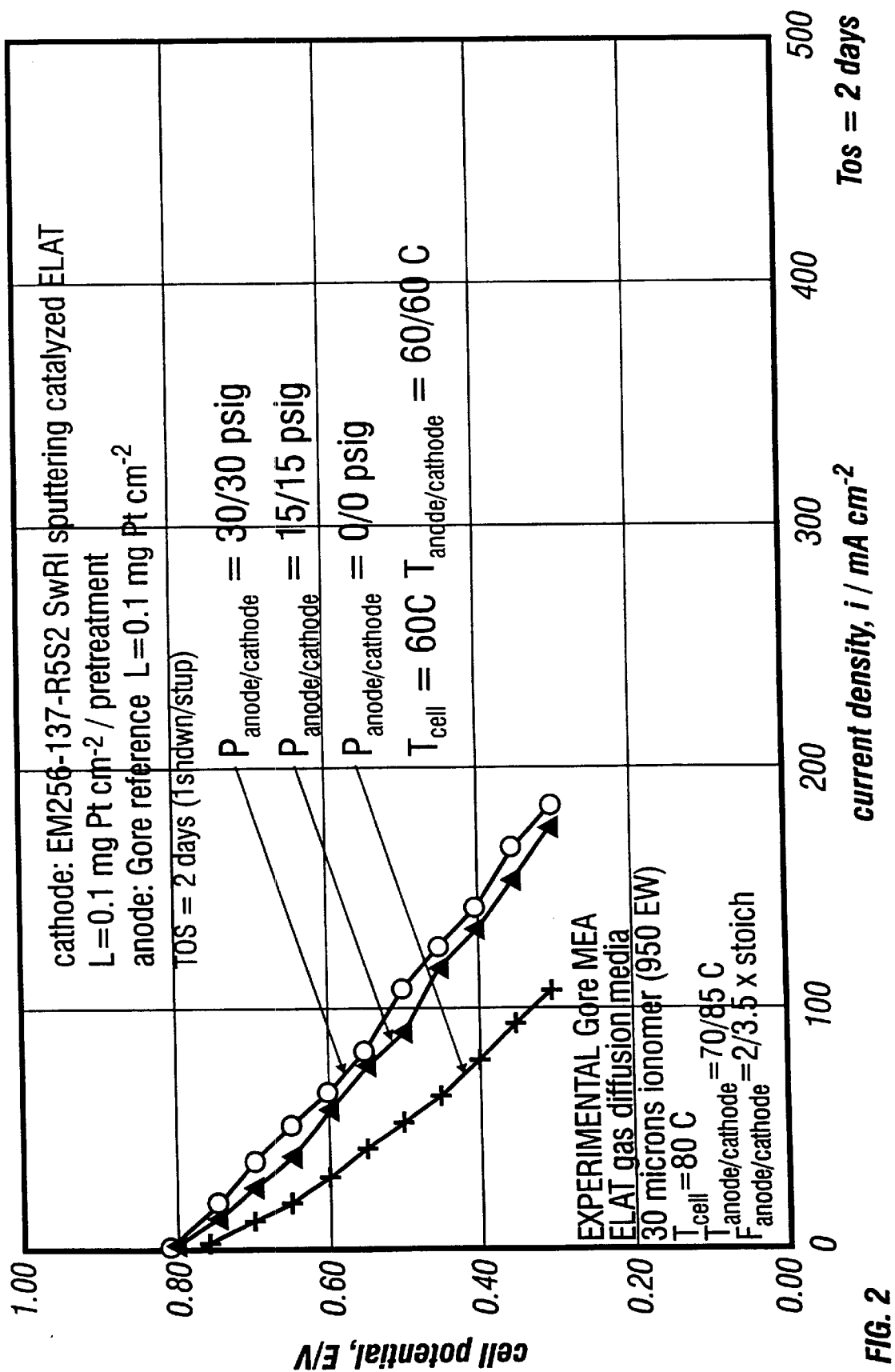
FIG. 2 is a graph depicting the polarization performance at 206.85 1kPa (30 psig) cell pressure of a conventional sputtered Pt catalyzed ELAT gas diffusion media experimental electrode used as cathode and anode, as described in Example IV.
Figure 3:
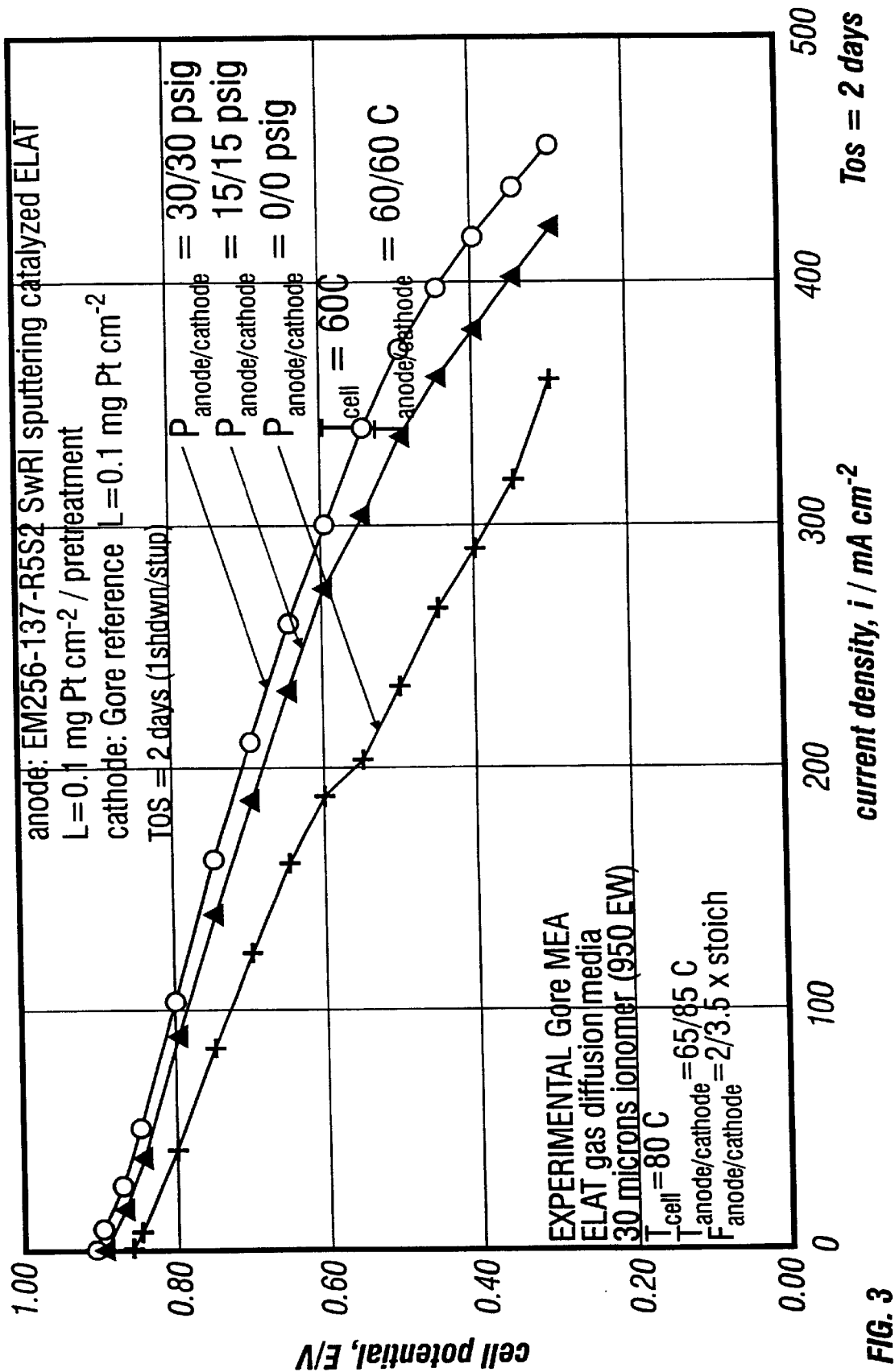
FIG. 3 is a graph depicting the polarization performance at 206.85 kPa (30 psig) cell pressure of a conventional sputtered Pt catalyzed ELAT gas diffusion media experimental electrode used as an anode, as described in Example IV.

Fuel Cell Performance Analysis: FIG. 1 shows the polarization performance-at 206.85 (30 psig) cell pressure of a Pt EB-PVD catalyzed ELAT gas diffusion media experimental electrode used as a cathode and anode. The MEA used was a Gore PRIMEA® membrane electrode assembly (anode or cathode). FIGS. 2 and 3 are the equivalent graphs (at different cell pressures) for the Pt-sputtered experimental electrode used as cathode and anode. Polarization performance from these graphs suggests that the Pt evaporated electrode displayed superior performance compared to the sputtered electrode for both cathode and anode operation.

Figure 4:
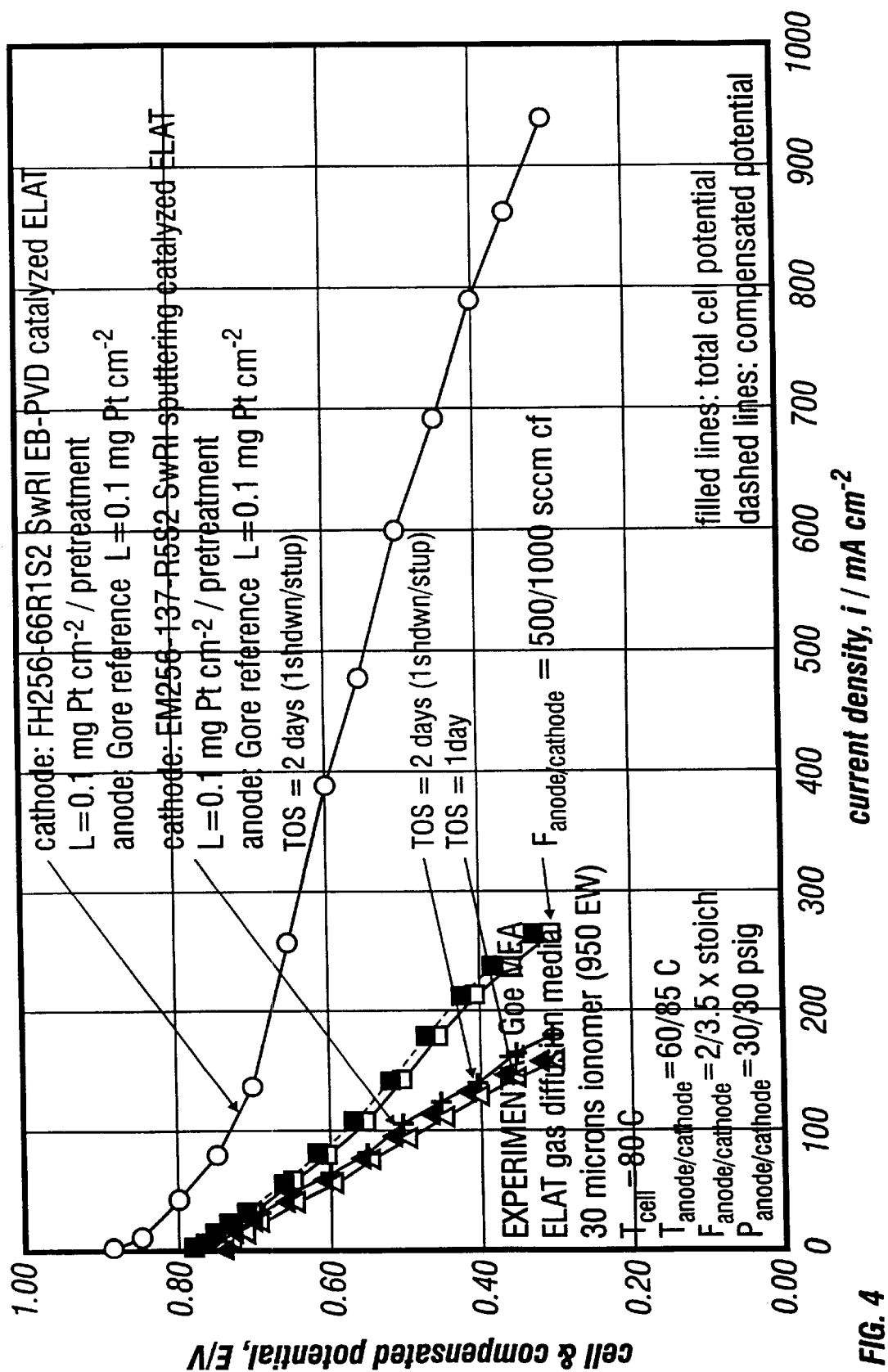
FIG. 4 is a graph depicting a side-by-side comparison of performance at cell and compensated potentials of a conventional sputtered Pt catalyzed experimental electrode and an inventive EB-PVD Pt catalyzed experimental electrode used as a cathode showing the polarization performance at 206.85 kPa (30 psig) cell pressure, as described in Example IV.
Figure 5:
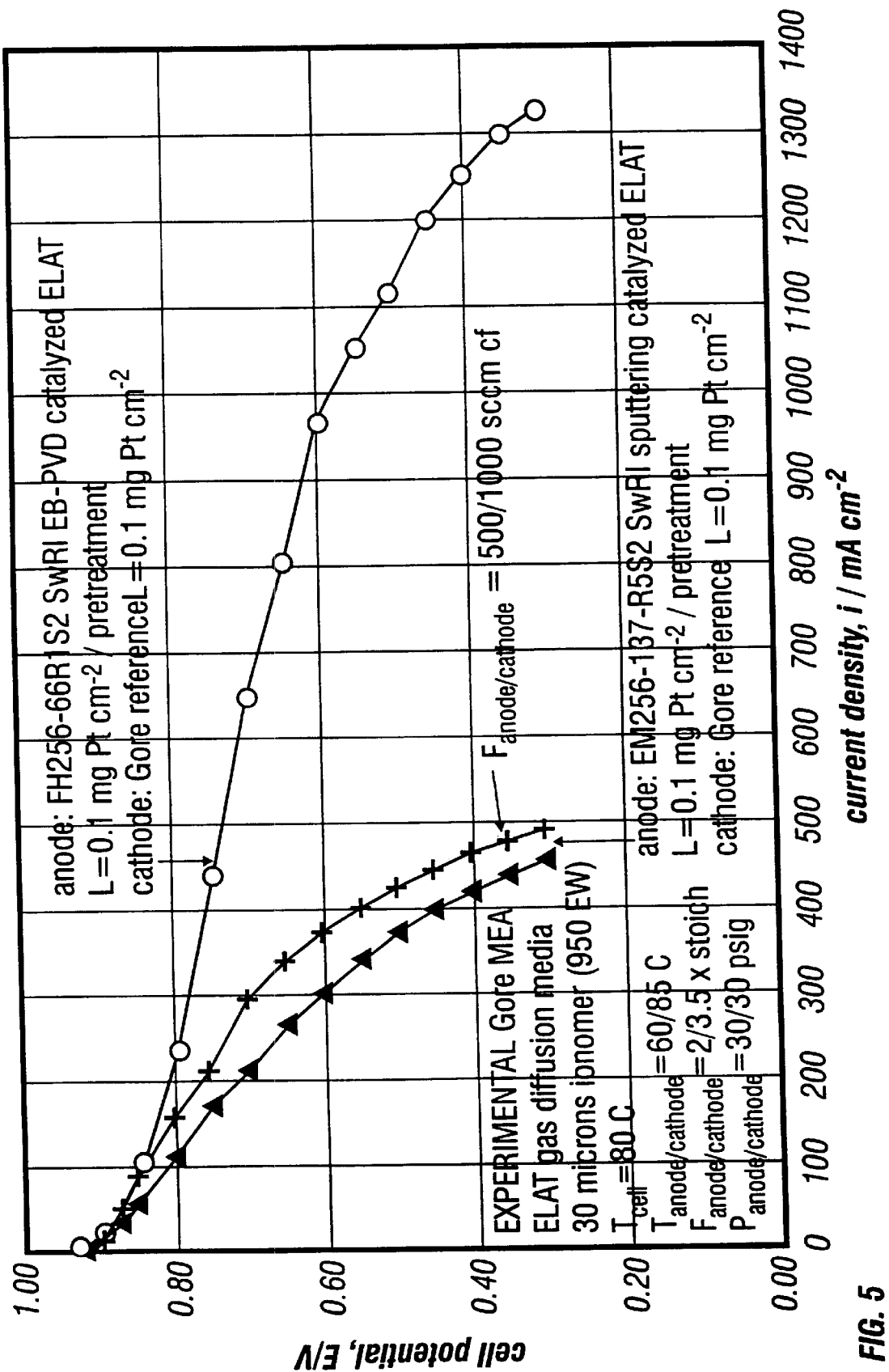
FIG. 5 is a graph depicting a side-by-side comparison of performance between a conventional sputter deposited Pt electrode and an inventive EB-PVD Pt deposited electrode used as an anode showing the polarization performance at 206.85 kPa (30 psig) cell pressure, as described in Example IV.

FIGS. 4 and 5 show a side-by-side comparison of performance between both vacuum catalyzation technologies. When used as a cathode, the inventive PVD catalyzed electrode showed improved performance throughout the entire polarization curve, i.e., OCV, activation region, ohmic region and mass transport region, compared with the sputtering catalyzed electrode (FIG. 4). For example, at 0.6 V, the MEA containing the PVD half cell operating as cathode yielded about 400 mA cm$^{-2}$ with an OCV of 0.889 V against 60–100 mA cm$^{-2}$ and OCV of 0.779–0.810 V for the sputtered system (i.e., 4 times lower performance). The compensated (IR-free) performance for the sputtered system followed the curve for the total cell potential indicating that the controlling electrode was the cathode half cell.

FIG. 5 shows the same analysis, but with the vacuum vaporized electrode used as anode. Here, although the OCV and the catalyst regions of the polarization curves were comparable for both systems (as expected due to the reference cathode operating as cathode in both cases), the IR region and the mass transport region for the MEA containing the sputtered electrode demonstrated substantially lower performance, i.e., larger slope, (larger membrane resistance and anode linear polarization losses) and more pronounced mass transport effects. For example, at 0.6 V cell potential, the MEA containing the sputtered anode yielded between 300 and 400 mA cm$^{-2}$ while the PVD anode-containing MEA yielded almost 1000 mA cm$^{-2}$. The difference in performance observed in this case (experimental electrode used as anode) was mostly due to anode polarization differences: at 0.6 V the sputtered anode suffered about 240 mV polarization loss against 92 mV polarization loss for the EB-PVD cathode.

Figure 6:
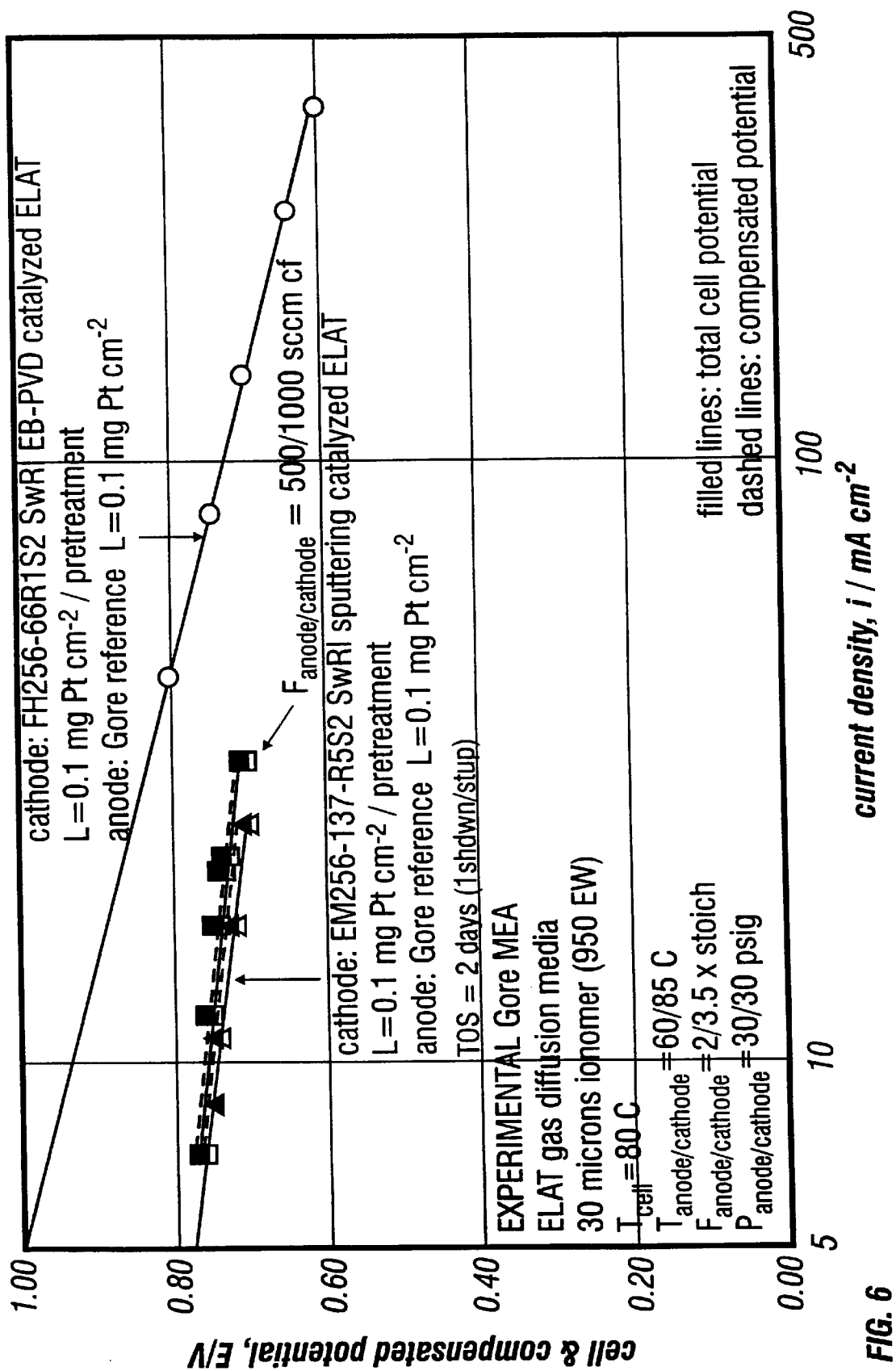
FIG. 6 is a graph depicting a side-by-side comparison of performance at cell and compensated potentials of another conventional sputter deposited Pt electrode and another inventive EB-PVD Pt deposited electrode used as a cathode showing the polarization performance at 206.85 kPa (30 psig) cell pressure, as described in Example IV.
Figure 7:
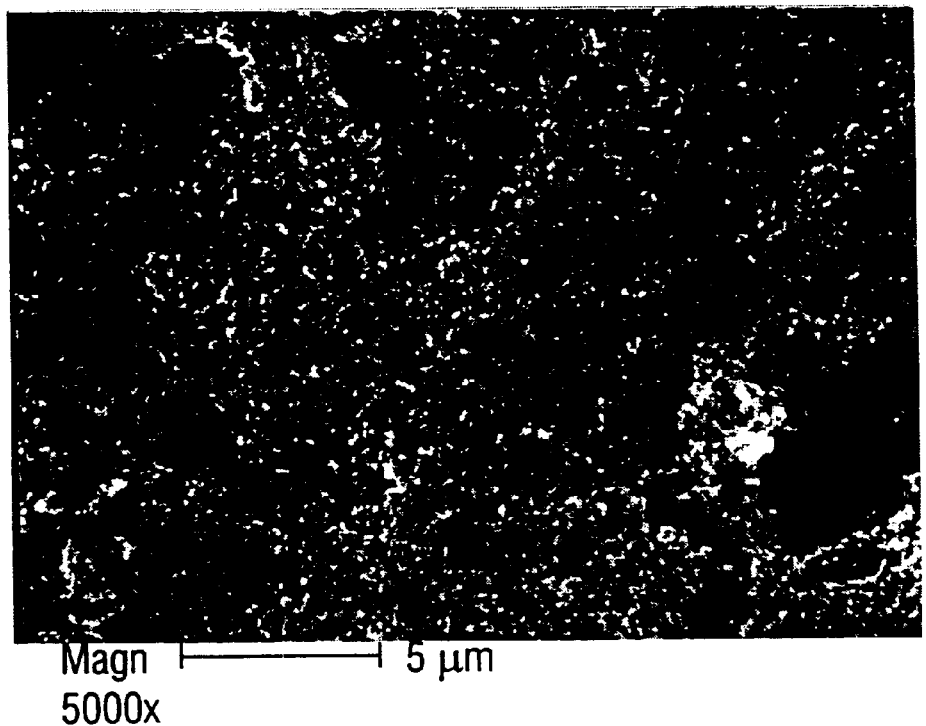
FIGS. 7–9 are field-emission scanning electron microscopy pictures (micrographs or FE-SEMs) of an uncatalyzed ELAT gas diffusion media at various magnifications.
Figure 8:
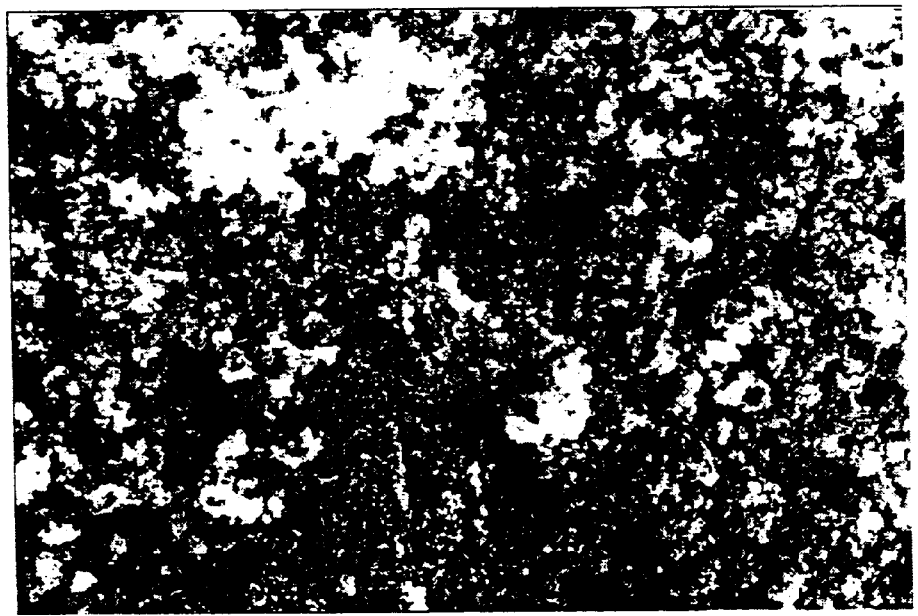
Figure 9:
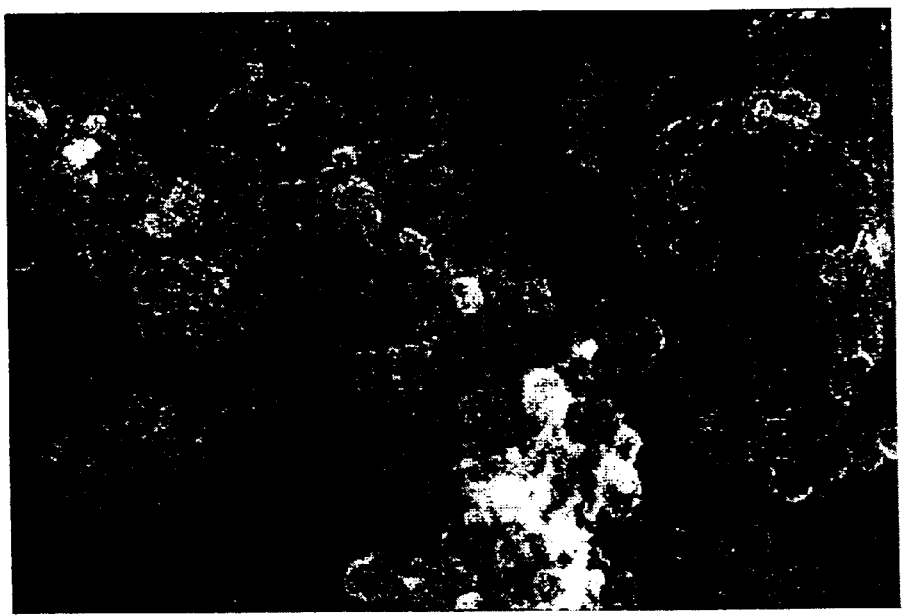
Figure 10:
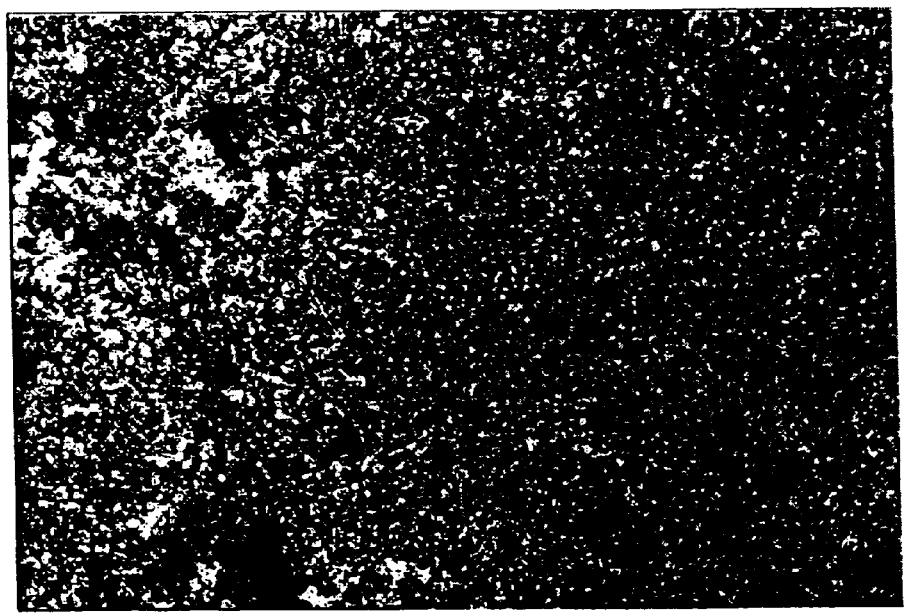
FIGS. 10–20 are FE-SEMs of ELAT gas diffusion media catalyzed using EB-PVD of Pt according to the present invention, as described in Examples III and IV, at various magnifications.
Figure 11:
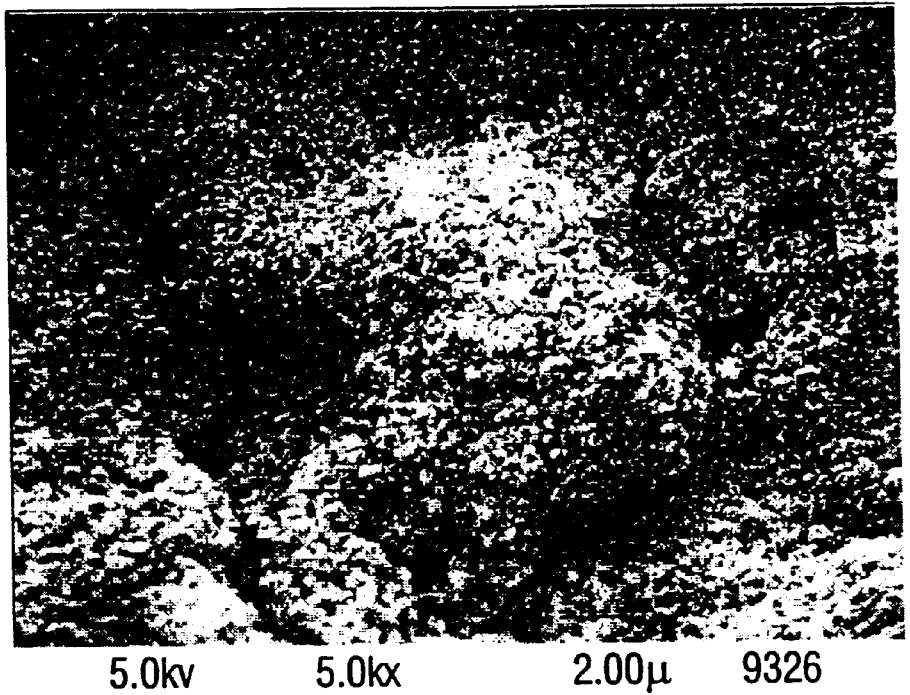
Figure 12:
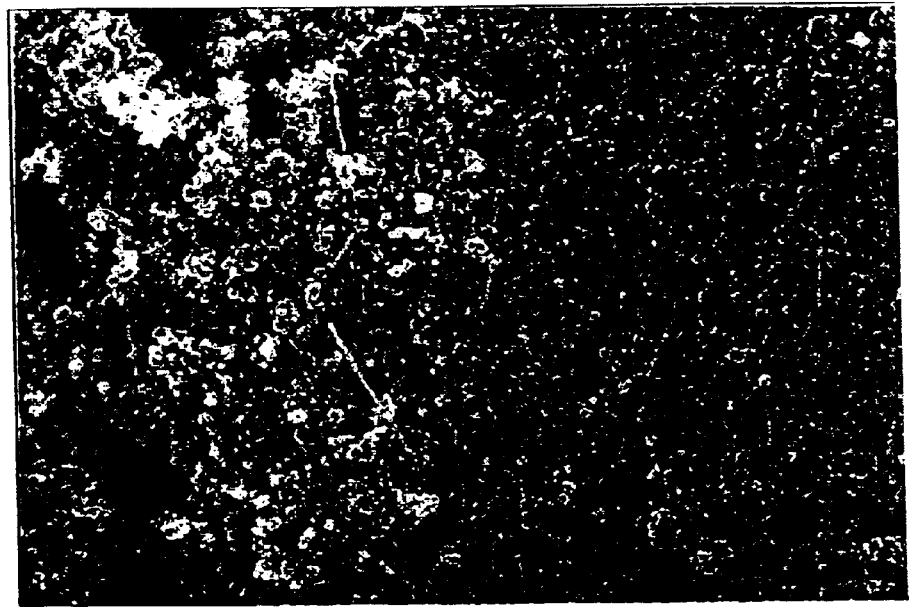
Figure 13:
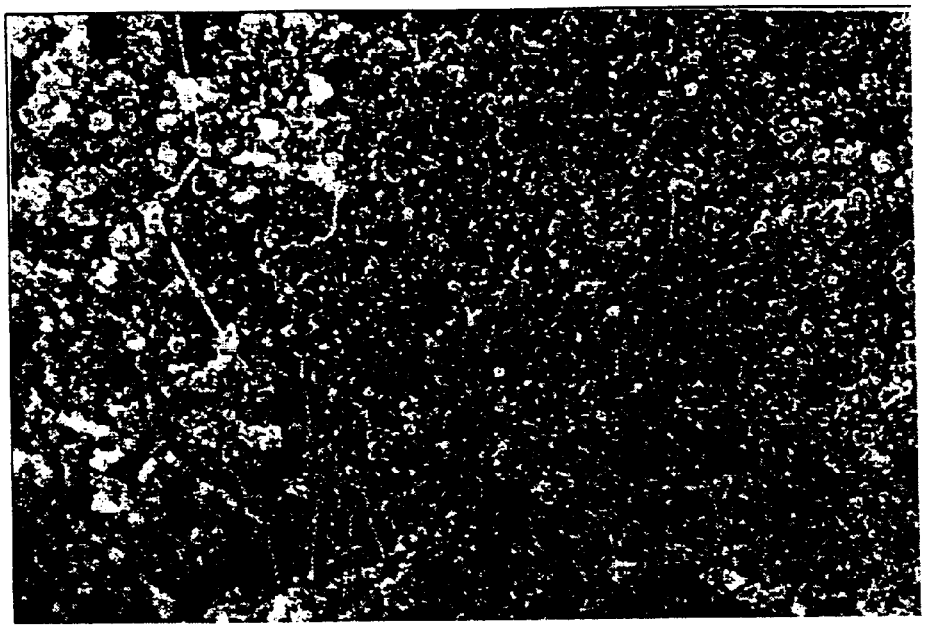
Figure 14:
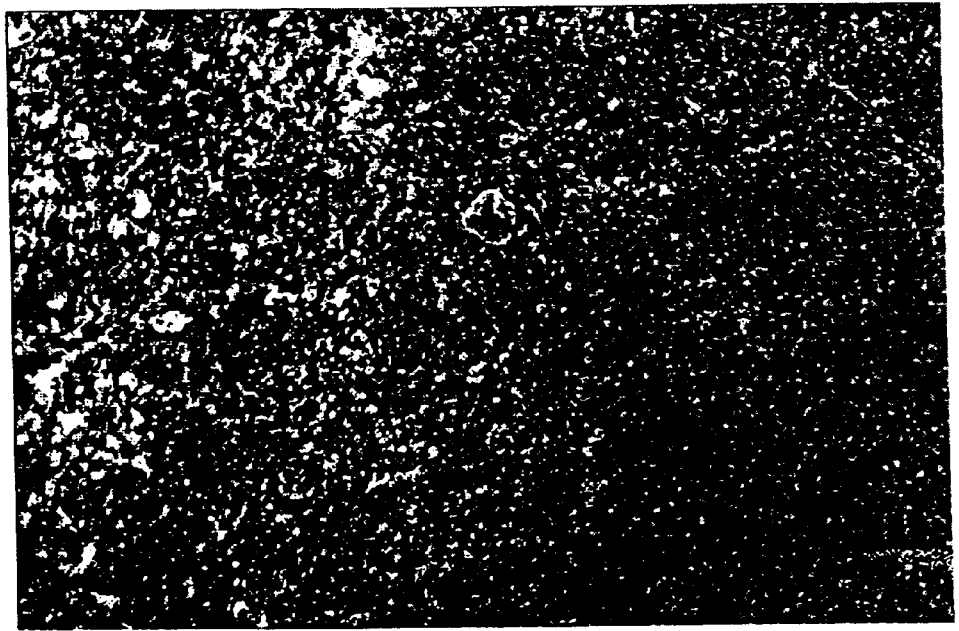
Figure 15:
Figure 16:
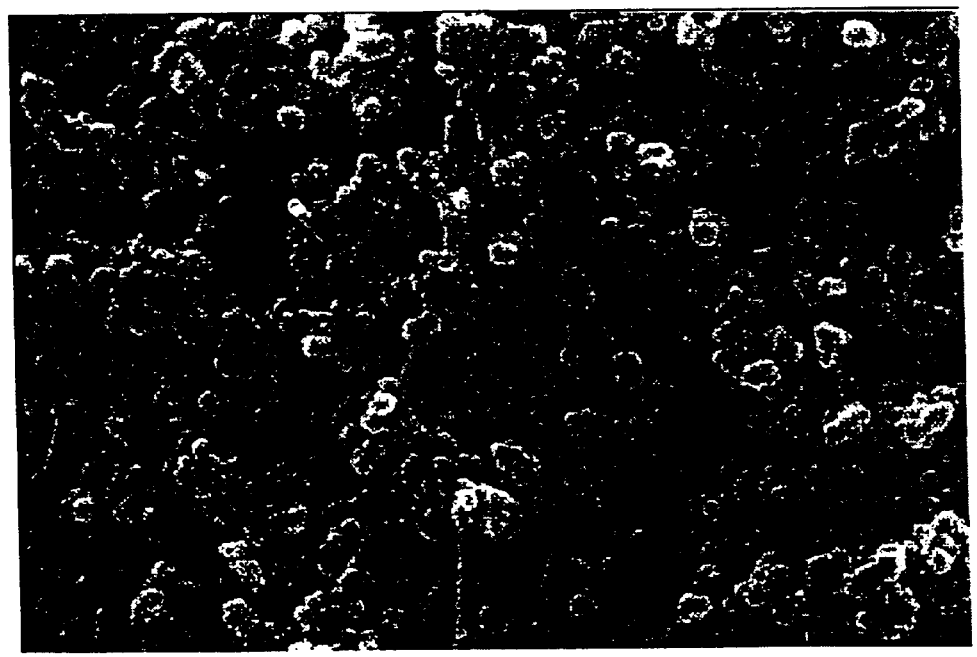

Tafel Analysis: In order to rationalize the difference in performance of electrodes made using EB-PVD versus sputtering, the electrocatalytic activity/activation polarization performance of the electrode was probed using a Tafel analysis. Briefly, a fuel cell polarization curve can be described using the semi-empirical equation:

$$E = E_0 - b \log i - iR - me^{ni}$$

where the first negative term (-b log i) indicates the cathode activation loss (electrocatalyst/electrodics, i.e., resistance to charge transfer), the second negative term (-iR) addresses the ohmic losses due to membrane resistance, contact potential and anode linear polarization losses, and the third negative term ($-me^{ni}$) addresses mass transport polarization losses. During a Tafel analysis, the ohmic and mass transport losses are normally eliminated and electrocatalytic parameters are measured by curve fitting the data to the following expression:

$$E_e = E + iR \approx E_0 - b \log i$$

where the compensated (iR-free) cell potential is used to eliminate any ohmic less that could be present in the catalyst region of the polarization curve. The Tafel slope, b and the parameter $E_0$ (which is related to the exchange current density $i_0$, and, thus related to the polarizability of the interface due to its dependence with the intrinsic electrocatalytic activity and the length of three phase boundary, TPB, i.e., number of electrocatalytic active sites or electrochemically active surface area) were then evaluated for the evaporated and sputtered vacuum coated electrodes used as a cathode (controlling half cell). The experimental Tafel curve is shown in FIG. 6.

Tafel analysis suggested that, although the Tafel slope for the evaporated electrode was larger than the sputtered electrode, the PVD cathode provided a substantially larger electrocatalytic active area (larger TPB) than the sputtered cathode, as found comparing the $E_n$ values for both electrodes 1.145 V (PVD) versus 0.853 V (sputtering). The superior polarization performance of the PVD electrode compared with the sputtered electrode can then be explained on the basis that the exchange current density $i_0$ for oxygen reduction in the evaporated electrodes was about 5 times higher than that in the sputtered electrode due to the larger electrochemically active area.

Although the foregoing argument is directly valid for the catalyst region of the polarization curve, the difference in performance observed at the ohmic and mass transport regions of the curve is only indirectly related to the reduced electrocatalytic active area. Factors which would directly relate to the difference in performance at the ohmic and mass transport regions of the curve would be, e.g., reduced hydration of membrane (due to lower current densities) or flooding. These factors, nevertheless, are directly related to current density, which is directly related to the extent of electrocatalytic area.

FE-SEM Analysis: In order to characterize the microstructure of the vacuum catalyzed electrodes, field-emission SEM was performed. FE-SEM micrographs for the uncatalyzed ELAT gas diffusion media were compared to FE-SEM micrographs for the Pt EB-PVD catalyzed ELAT diffusor and Pt sputtered catalyzed diffusor. Magnifications from x5 k up to x50 k were used. Pictures with x25 k and x50 k magnification showed most of the differences in structure.

Significant differences on the morphology of the Pt catalyst coating were observed between the EB-PVD and magnetron sputtering coating technologies. On the sputtered sample, the Pt particles were in the form of aggregates (FIGS. 23–28), and in some cases the particles appeared to coalesce and form larger "fused" particles with a longitudinal dimension (18c, 18d, FIG. 25) of from about 400 to about 1000 nm. In these "fused" particles (18c, 18d, FIG. 25), the outer surface of individual particles was no longer visible (18, 18a, and 18b in FIGS. 26 and 27).

On the EB-PVD catalyzed sample, the Pt particles were in the form of aggregates and in some cases the particles (12, FIG. 17) appeared to coalesce and form patches (14, FIG. 17). But the outer surface of individual Pt particles (2, FIG. 17) was readily recognizable in the coalesced patches as compared to that of the coalesced particles in the Pt sputtered sample (18, 18a, 18b, FIGS. 26 and 27). In addition, a good amount of rod-like Pt particles 10 (FIGS. 14, 15, and 17–22) were observed on the EB-PVD catalyzed sample. These rod-like particles were not observed in the sputtered sample.

Persons of ordinary skill in the art will recognize that many modifications may be made to the present invention without departing from the spirit and scope of the present invention. The embodiments described herein are meant to be illustrative only and should not be taken as limiting the invention, which is defined in the following claims.

We claim:

1. A fuel cell electrode comprising a support comprising a deposit disposed thereon, said deposit comprising a catalytically effective load of an electrocatalyst comprising an electrocatalytic active area at least in part comprising rod-shaped structures of said electrocatalyst.

2. The fuel cell electrode of claim 1 wherein said rod-like structures are visible at a magnification of at least about x10 k.

3. The fuel cell electrode of claim 1 wherein said deposit further comprises particles of said electrocatalyst comprising an outer surface, wherein said electrocatalytic active area comprises a majority of said outer surface of said particles.

4. The fuel cell electrode of claim 2 wherein said deposit further comprises particles of said electrocatalyst comprising an outer surface, wherein said electrocatalytic active area comprises a majority of said outer surface of said partcles.

5. The fuel cell electrode of claim 1 wherein said electrocatalyst comprises a metal selected from the group consisting of Ti, Zr, Hf, V, Nb, Ta, Cr, Mo, W, Mn, Tc, Re, Fe, Ru, Os, Co, Rh, Ir, Ni, Pd, Pt, Ni, Pd, Pt, Cu, Ag, and Au.

6. The fuel cell electrode of claim 1 wherein said electrocatalyst comprises a meal selected from the group consisting of Ti, Zr, Hf, V, Nb, Ta, Cr, Mo, W, Mn, Tc, Re, Fe, Ru, Os, Co, Rh, Ir, Ni, Pd, Pt, Ni, Pd, and Pt.

7. The fuel cell electrode of claim 1 wherein said electrocatalyst comprises a metal selected from the group consisting of Ni, Pd, and Pt.

8. The fuel cell electrode of claim 4 wherein said electrocatalyst comprises a metal selected from the group consisting of Ti, Zr, Hf, V, Nb, Ta, Cr, Mo, W, Mn, Tc, Re, Fe, Ru, Os, Co, Rh, Ir, Ni, Pd, Pt, Ni, Pd, and Pt.

9. The fuel cell electrode of claim 4 wherein said electrocatalyst comprises a metal selected from the group consisting of Ni, Pd, and Pt.

10. A fuel cell electrode comprising a support comprising a deposit disposed thereon, said deposit comprising a catalytically effective load of an electrocatalyst comprising at least one noble metal and comprising an electrocatalytic active area at least in part comprising rod-shaped structures of said at least one noble metal.

11. The fuel cell electrode of claim 10 wherein said rod-like structures are visible at a magnification of at least about ×10 k.

12. The fuel cell electrode of claim 10 wherein said deposit further comprises particles of said electrocatalyst comprising an outer surface, wherein said electrocatalytic active area comprises a majority of said outer surface of said particles.

13. The fuel cell electrode of claim 11 wherein said deposit further comprises particles of said electrocatalyst comprising an outer surface, wherein said electrocatalytic active area comprises a majority of said outer surface of said particles.

14. The fuel cell electrode of claim 10 wherein said electrocatalyst comprises platinum.

15. The fuel cell electrode of claim 13 wherein said electrocatalyst comprises platinum.

16. The fuel cell electrode of claim 10 wherein said electrocatalyst consists essentially of platinum.

17. The fuel cell electrode of claim 13 wherein said electrocatalyst consists essentially of platinum.

18. The fuel cell electrode of claim 10 wherein, at a cell potential of about 0.6 V, a membrane electrode assembly containing said fuel cell electrode as a half cell operating as a cathode yields a power output of about 800 mA cm$^{-2}$ or greater.

19. The fuel cell electrode of claim 13 wherein, at a cell potential of about 0.6 V, a membrane electrode assembly containing said fuel cell electrode as a half cell operating as a cathode yields a power output of about 800 mA cm$^{-2}$ or greater.

20. The fuel cell electrode of claim 14 wherein, at a cell potential of about 0.6 V, a membrane electrode assembly containing said fuel cell electrode as a half cell operating as a cathode yields a power output of about 800 mA cm$^{-2}$ or greater.

21. The fuel cell electrode of claim 15 wherein, at a cell potential of about 0.6 V, a membrane electrode assembly containing said fuel cell electrode as a half cell operating as a cathode yields a power output of about 800 mA cm$^{-2}$ or greater.

22. The fuel cell electrode of claim 16 wherein, at a cell potential of about 0.6 V, a membrane electrode assembly containing said fuel cell electrode as a half cell operating as a cathode yields a power output of about 800 mA cm$^{-2}$ or greater.

23. The fuel cell electrode of claim 17 wherein, at a cell potential of about 0.6 V, a membrane electrode assembly containing said fuel cell electrode as a half cell operating as a cathode yields a power output of about 800 mA cm$^{-2}$ or greater.

24. The fuel cell electrode of claim 14 wherein said load comprises less than about 0.3 mg/cm$^2$ of said platinum.

25. The fuel cell electrode of claim 14 wherein said load comprises less than about 0.2 mg/cm$^2$ of said platinum.

26. The fuel cell electrode of claim 14 wherein said load comprises from about 0.01 to about 0.2 mg/cm$^2$ of said platinum.

27. The fuel cell electrode of claim 14 wherein said load is about 0.01 mg/cm$^2$ or less of said platinum.

28. The fuel cell electrode of claim 15 wherein said load comprises less than about 0.3 mg/cm$^2$ of said platinum.

29. The fuel cell electrode of claim 15 wherein said load comprises less than about 0.2 mg/cm$^2$ of said platinum.

30. The fuel cell electrode of claim 15 wherein said load comprises from about 0.01 to about 0.2 mg/cm$^{-2}$ of said platinum.

31. The fuel cell electrode of claim 15 wherein said load is about 0.01 mg/cm$^2$ or less of said platinum.

32. The fuel cell electrode of claim 20 wherein said load comprises less than about 0.3 mg/cm$^2$ of said platinum.

33. The fuel cell electrode of claim 20 wherein said load comprises less than about 0.2 mg/cm$^2$ of said platinum.

34. The fuel cell electrode of claim 20 wherein said load comprises from about 0.01 to about 0.2 mg/cm$^2$ of said platinum.

35. The fuel cell electrode of claim 20 wherein said load is about 0.01 mg/cm$^2$ or less of said platinum.

36. The fuel cell electrode of claim 21 wherein said load comprises less than about 0.3 mg/cm$^2$ of said platinum.

37. The fuel cell electrode of claim 21 wherein said load comprises less than about 0.2 mg/cm$^2$ of said platinum.

38. The fuel cell electrode of claim 21 wherein said load comprises from about 0.01 to about 0.2 mg/cm$^2$ of said platinum.

39. The fuel cell electrode of claim 21 wherein said load is about 0.01 mg/cm$^2$ or less of said platinum.

40. The fuel cell electrode of claim 14 wherein said support has a surface area, and said deposit covers about 300 cm$^2$ or more of said surface area.

41. The fuel cell electrode of claim 18 wherein said support has a surface area, and said deposit covers about 300 cm$^2$ or more of said surface area.

42. The fuel cell electrode of claim 19 wherein said support has a surface area, and said deposit covers about 300 cm$^2$ or more of said surface area.

43. The fuel cell electrode of claim 20 wherein said support has a surface area, and said deposit covers about 300 cm$^2$ or more of said surface area.

44. The fuel cell electrode of claim 21 wherein said support has a surface area, and said deposit covers about 300 cm$^2$ or more of said surface area.

45. The fuel cell electrode of claim 22 wherein said support has a surface area, and said deposit covers about 300 cm$^2$ or more of said surface area.

46. The fuel cell electrode of claim 23 wherein said support has a surface area, and said deposit covers about 300 cm$^2$ or more of said surface area.

47. The fuel cell electrode of claim 10 wherein
said support has a surface area; and,
substantially all of said surface area ionically communicates with an ionomeric membrane.

48. The fuel cell electrode of claim 13 wherein
said support has a surface area; and,
substantially all of said surface area ionically communicates with an ionomeric membrane.

49. The fuel cell electrode of claim 20 wherein
said support has a surface area; and,
substantially all of said surface area ionically communicates with an ionomeric membrane.

50. The fuel cell electrode of claim 21 wherein
said support has a surface area; and,
substantially all of said surface area ionically communicates with an ionomeric membrane.

51. The fuel cell electrode of claim 48 wherein substantially all of said surface area tonically communicates with an ionomeric membrane.

52. The fuel cell electrode of claim 49 wherein substantially all of said surface area ionically communicates with an ionomeric membrane.

53. The fuel cell electrode of claim 50 wherein substantially all of said surface area ionically communicates with an ionomeric membrane.

54. A membrane electrode assembly comprising the fuel cell electrode of claim 47.

55. A membrane electrode assembly comprising the fuel cell electrode of claim 50.

56. A fuel cell electrode comprising a support comprising a deposit disposed thereon, said deposit comprising a catalytically effective load of an electrocatalyst comprising platinum and comprising an electrocatalytic active area at least in part comprising rod-shaped structures of said electrocatalyst, wherein at a cell potential of about 0.6 V, a membrane electrode assembly containing said fuel cell electrode as a half cell operating as a cathode yields a power output of about 800 mA cm$^{-2}$ or greater.

57. The fuel cell electrode of claim 56 wherein said rod-like structures are visible at a magnification of at least about ×10 k.

58. The fuel cell electrode of claim 56 wherein said deposit further comprises particles of said electrocatalyst comprising an outer surface, wherein said electrocatalytic active area comprises a majority of said outer surface of said particles.

59. The fuel cell electrode of claim 57 wherein said deposit further comprises particles of said electrocatalyst comprising an outer surface, wherein said electrocatalytic active area comprises a majority of said outer surface of said particles.

60. The fuel cell electrode of claim 56 wherein said support is a carbon catalyst support.

61. The fuel cell electrode of claim 59 wherein said support is a carbon catalyst support.

62. The fuel cell electrode of claim 56 wherein said load comprises less than about 0.3 mg/cm$^2$ of said platinum.

63. The fuel cell electrode of claim 56 wherein said load comprises less than about 0.2 mg/cm$^2$ of said platinum.

64. The fuel cell electrode of claim 56 wherein said load comprises from about 0.01 to about 0.2 mg/cm$^2$ of said platinum.

65. The fuel cell electrode of claim 56 wherein said load is about 0.01 mg/cm$^2$ or less of said platinum.

66. The fuel cell electrode of claim 60 wherein said load comprises less than about 0.3 mg/cm$^2$ of said platinum.

67. The fuel cell electrode of claim 60 wherein said load comprises less than about 0.2 mg/cm$^2$ of said platinum.

68. The fuel cell electrode of claim 60 wherein said load comprises from about 0.01 to about 0.2 mg/cm$^2$ of said platinum.

69. The fuel cell electrode of claim 60 wherein said load is about 0.01 mg/cm$^2$ or less of said platinum.

70. The fuel cell electrode of claim 61 wherein said load comprises less than about 0.3 mg/cm$^2$ of said platinum.

71. The fuel cell electrode of claim 61 wherein said load comprises less than about 0.2 mg/cm$^2$ of said platinum.

72. The fuel cell electrode of claim 61 wherein said load comprises from about 0.01 to about 0.2 mg/cm$^2$ of said platinum.

73. The fuel cell electrode of claim 61 wherein said load is about 0.01 mg/cm$^2$ or less of said platinum.

74. The fuel cell electrode of claim 56 wherein said support has a surface area, and said deposit covers about 300 cm$^2$ or more of said surface area.

75. The fuel cell electrode of claim 60 wherein said support has a surface area, and said deposit covers about 300 cm$^2$ or more of said surface area.

76. The fuel cell electrode of claim 61 wherein said support has a surface area, and said deposit covers about 300 cm$^2$ or more of said surface area.

77. The fuel cell electrode of claim 67 wherein said support has a surface area, and said deposit covers about 300 cm$^2$ or more of said surface area.

78. The fuel cell electrode of claim 71 wherein said support has a surface area, and said deposit covers about 300 cm$^2$ or more of said surface area.

79. The fuel cell electrode of claim 60 wherein
said support has a surface area; and,
substantially all of said surface area ionically communicates with an ionomeric membrane.

80. The fuel cell electrode of claim 61 wherein
said support has a surface area; and,
substantially all of said surface area ionically communicates with an ionomeric membrane.

81. The fuel cell electrode of claim 71
said support has a surface area; and,
substantially all of said surface area ionically communicates with an ionomeric membrane.

82. The fuel cell electrode of claim 78 wherein
said support has a surface area; and,
substantially all of said surface area ionically communicates with an ionomeric membrane.

83. The fuel cell electrode of claim 79 wherein said ionomeric membrane comprises a composite of polytetrafluoroethylene comprising impregnated ion exchange media.

84. The fuel cell electrode of claim 83 wherein said composite comprises a thickness of about 1 μm.

85. The fuel cell electrode of claim 80 wherein said ionomeric membrane comprises a composite of polytetrafluoroethylene comprising impregnated ion exchange media.

86. The fuel cell electrode of claim 85 wherein said composite comprises a thickness of about 1 μm.

87. The fuel cell electrode of claim 81 wherein said ionomeric membrane comprises a composite of polytetrafluoroethylene comprising impregnated ion exchange media.

88. The fuel cell electrode of claim 87 wherein said composite comprises a thickness of about 1 μm.

89. The fuel cell electrode of claim 82 wherein said ionomeric membrane comprises a composite of polytetrafluoroethylene comprising impregnated ion exchange media.

90. The fuel cell electrode of claim 89 said composite comprises a thickness of about 1 μm.

91. The fuel cell electrode of claim 83 wherein said ionomeric membrane comprises a composite of polytetrafluoroethylene comprising impregnated ion exchange media.

92. The fuel cell electrode of claim 91 wherein said composite comprises a thickness of about 1 μm.

93. A membrane electrode assembly comprising the fuel cell electrode of claim 55.

94. A membrane electrode assembly comprising the fuel cell electrode of claim 91.

95. A fuel cell electrode comprising a support comprising a deposit disposed thereon, said deposit comprising a catalytically effective load of an electrocatalyst comprising less than about 0.2 mg/cm$^2$ platinum, and comprising an electrocatalytic active area at least in part comprising rod-shaped structures of said electrocatalyst, wherein said support has a surface area, and said deposit covers about 300 cm$^2$ or more of said surface area, wherein, at a cell potential of about 0.6 V, a membrane electrode assembly containing said fuel cell electrode as a half cell operating as a cathode yields a power output of about 800 mA cm$^{-2}$ or greater.

96. The fuel cell electrode of claim 95 wherein said rod-like structures are visible at a magnification of at least about ×10 k.

97. The fuel cell electrode of claim 95 wherein said deposit further comprises particles of said electrocatalyst comprising an outer surface, wherein said electrocatalytic active area comprises a majority of said outer surface of said particles.

98. The fuel cell electrode of claim 96 wherein said deposit further comprises particles of said electrocatalyst comprising an outer surface, wherein said electrocatalytic active area comprises a majority of said outer surface of said particles.

99. The fuel cell electrode of claim 95 wherein said support is a carbon catalyst support.

100. The fuel cell electrode of claim 98 wherein said support is a carbon catalyst support.

101. The fuel cell electrode of claim 95 wherein
said support has a surface area; and,
substantially all of said surface area ionically communicates with an ionomeric membrane.

102. The fuel cell electrode of claim 98 wherein
said support has a surface area; and,
substantially all of said surface area ionically communicates with an ionomeric membrane.

103. The fuel cell electrode of claim 99 wherein
said support has a surface area; and,
substantially all of said surface area ionically communicates with an ionomeric membrane.

104. The fuel cell electrode of claim 100 wherein said carbon catalyst support comprises a material selected from the group consisting of a carbon filament bundle, reticulated carbon, carbon cloth, and carbon mesh.

105. The fuel cell electrode of claim 100 wherein said carbon catalyst support comprises a material selected from the group consisting of a carbon cloth and a coating on a carbon cloth selected from the group consisting of carbon, a wet proofing material, and a combination thereof.

106. The fuel cell electrode of claim 101 wherein said ionomeric membrane comprises a composite of polytetrafluoroethylene comprising impregnated ion exchange media.

107. The fuel cell electrode of claim 106 wherein said composite comprises a thickness of about 1 $\mu$m.

108. The fuel cell electrode of claim 102 wherein said ionomeric membrane comprises a composite of polytetrafluoroethylene comprising impregnated ion exchange media.

109. The fuel cell electrode of claim 108 wherein said composite comprises a thickness of about 1 $\mu$m.

110. The fuel cell electrode of claim 103 wherein said ionomeric membrane comprises a composite of polytetrafluoroethylene comprising impregnated ion exchange media.

111. The fuel cell electrode of claim 110 wherein said composite comprises a thickness of about 1 $\mu$m.

112. A membrane electrode assembly comprising the fuel cell electrode of claim 95.

113. A membrane electrode assembly comprising the fuel cell electrode of claim 111.

114. A fuel cell electrode comprising a support comprising a deposit disposed thereon, said deposit comprising a catalytically effective load of platinum, and comprising an electrocatalytic active area at least in part comprising red-shaped structures of said platinum.

115. The fuel cell electrode of claim 114 wherein said rod-like structures are visible at a magnification of at least about ×10 k.

116. The fuel cell electrode of claim 114 wherein said deposit further comprises particles of said electrocatalyst comprising an outer surface, wherein said electrocatalytic active area comprises a majority of said outer surface of said particles.

117. The fuel cell electrode of claim 115 wherein said deposit further comprises particles of said electrocatalyst comprising an outer surface, wherein said electrocatalytic active area comprises a majority of said outer surface of said particles.

118. The fuel cell electrode of claim 114 wherein said support is a carbon catalyst support.

119. The fuel cell electrode of claim 117 wherein said support is a carbon catalyst support.

120. The fuel cell electrode of claim 114 wherein
said support has a surface area; and,
substantially all of said surface area ionically communicates with an ionomeric membrane.

121. The fuel cell electrode of claim 113 wherein
said support has a surface area; and,
substantially all of said surface area ionically communicates with an ionomeric membrane.

122. The fuel cell electrode of claim 114 wherein
said support has a surface area; and,
substantially all of said surface area ionically communicates with an ionomeric membrane.

123. The fuel cell electrode of claim 119 wherein said carbon catalyst support comprises a material selected from the group consisting of a carbon filament bundle, reticulated carbon, carbon cloth, and carbon mesh.

124. The fuel cell electrode of claim 119 wherein said carbon catalyst support comprises a material selected from the group consisting of a carbon cloth and a coating on a carbon cloth selected from the group consisting of carbon, a wet proofing material, and a combination thereof.

125. The fuel cell electrode of claim 120 wherein said ionomeric membrane comprises a composite of polytetrafluoroethylene comprising impregnated ion exchange media.

126. The fuel cell electrode of claim 125 wherein said composite comprises a thickness of about 1 $\mu$m.

127. The fuel cell electrode of claim 121 wherein said ionomeric membrane comprises a composite of polytetrafluoroethylene comprising impregnated ion exchange media.

128. The fuel cell electrode of claim 127 wherein said composite comprises a thickness of about 1 $\mu$m.

129. The fuel cell electrode of claim 122 wherein said ionomeric membrane comprises a composite of polytetrafluoroethylene comprising impregnated ion exchange media.

130. The fuel cell electrode of claim 129 wherein said composite comprises a thickness of about 1 $\mu$m.

131. A membrane electrode assembly comprising the fuel cell electrode of claim 114.

132. A membrane electrode assembly comprising the fuel cell electrode of claim 130.

133. A fuel cell electrode comprising a support comprising a deposit disposed thereon, said deposit comprising a catalytically effective load of platinum, and comprising an electrocatalytic active area at least in part comprising rod-shaped structures of said platinum wherein said support has a surface area, and said deposit covers about 300 cm² or more of said surface area, wherein, at a cell potential of about 0.6 V, a membrane electrode assembly containing said fuel cell electrode as a half cell operating as a cathode yields a power output of about 800 mA cm$^{-2}$ or greater.

134. The fuel cell electrode of claim 133 wherein said rod-like structures are visible at a magnification of at least about ×10 k.

135. The fuel cell electrode of claim 133 wherein said deposit further comprises particles of said electrocatalyst comprising an outer surface, wherein said electrocatalytic active area comprises a majority of said outer surface of said particles.

136. The fuel cell electrode of claim 134 wherein said deposit further comprises particles of said electrocatalyst comprising an outer surface, wherein said electrocatalytic active area comprises a majority of said outer surface of said particles.

137. The fuel cell electrode of claim 133 wherein said electrocatalyst consists essentially of platinum.

138. The fuel cell electrode of claim 136 wherein said electrocatalyst consists essentially of platinum.

139. The fuel cell electrode of claim 133 wherein said support is a carbon catalyst support.

140. The fuel cell electrode of claim 136 wherein said support is a carbon catalyst support.

141. The fuel cell electrode of claim 137 wherein said support is a carbon catalyst support.

142. The fuel cell electrode of claim 138 wherein said support is a carbon catalyst support.

143. The fuel cell electrode of claim 133 wherein
said support has a surface area; and,
substantially all of said surface area ionically communicates with an ionomeric membrane.

144. The fuel cell electrode of claim 139 wherein
said support has a surface area; and,
substantially all of said surface area ionically communicates with an ionomeric membrane.

145. The fuel cell electrode of claim 140 wherein
said support has a surface area; and,
substantially all of said surface area ionically communicates with an ionomeric membrane.

146. The fuel cell electrode of claim 141 wherein
said support has a surface area; and,
substantially all of said surface area ionically communicates with an ionomeric membrane.

147. The fuel cell electrode of claim 142 wherein
said support has a surface area; and,
substantially all of said surface area ionically communicates with an ionomeric membrane.

148. The fuel cell electrode of claim 140 wherein said carbon catalyst support comprises a material selected from the group consisting of a carbon filament bundle, reticulated carbon, carbon cloth, and carbon mesh.

149. The fuel cell electrode of claim 142 wherein said carbon catalyst support comprises a material selected from the group consisting of a carbon filament bundle, reticulated carbon, carbon cloth, and carbon mesh.

150. The fuel cell electrode of claim 140 wherein said carbon catalyst support comprises a material selected from the group consisting of a carbon cloth and a coating on a carbon cloth selected from the group consisting of carbon, a wet proofing material, and a combination thereof.

151. The fuel cell electrode of claim 142 wherein said carbon catalyst support comprises a material selected from the group consisting of a carbon cloth and a coating on a carbon cloth selected from the group consisting of carbon, a wet proofing material, and a combination thereof.

152. The fuel cell electrode of claim 143 wherein said ionomeric membrane comprises a composite of polytetrafluoroethylene comprising impregnated ion exchange media.

153. The fuel cell electrode of claim 152 wherein said composite comprises a thickness of about 1 $\mu$m.

154. The fuel cell electrode of claim 144 wherein said ionomeric membrane comprises a composite of polytetrafluoroethylene comprising impregnated ion exchange media.

155. The fuel cell electrode of claim 154 wherein said composite comprises a thickness of about 1 $\mu$m.

156. The fuel cell electrode of claim 145 wherein said ionomeric membrane comprises a composite of polytetrafluoroethylene comprising impregnated ion exchange media.

157. The fuel cell electrode of claim 156 wherein said composite comprises a thickness of about 1 $\mu$m.

158. The fuel cell electrode of claim 146 wherein said ionomeric membrane comprises a composite of polytetrafluoroethylene comprising impregnated ion exchange media.

159. The fuel cell electrode of claim 153 wherein said composite comprises a thickness of about 1 $\mu$m.

160. The fuel cell electrode of claim 147 wherein said ionomeric membrane comprises a composite of polytetrafluoroethylene comprising impregnated ion exchange media.

161. The fuel cell electrode of claim 160 wherein said composite comprises a thickness of about 1 $\mu$m.

* * * * *